US011845256B2

(12) United States Patent
 Gu

(10) Patent No.: US 11,845,256 B2
(45) Date of Patent: Dec. 19, 2023

(54) COMPOSITE FILM MODULE, METHOD FOR MANUFACTURING THE SAME, LIGHT COLLECTING DEVICE AND DISPLAY DEVICE

(71) Applicant: Xiamen Tianma Micro-Electronics Co., Ltd., Xiamen (CN)

(72) Inventor: Yuefeng Gu, Shanghai (CN)

(73) Assignee: Xiamen Tianma Micro-Electronics Co., Ltd., Xiamen (CN)

( * ) Notice: Subject to any disclaimer, the term of this patent is extended or adjusted under 35 U.S.C. 154(b) by 116 days.

(21) Appl. No.: 17/205,464

(22) Filed: Mar. 18, 2021

(65) Prior Publication Data
US 2021/0206142 A1   Jul. 8, 2021

(30) Foreign Application Priority Data

Dec. 28, 2020   (CN) .......................... 202011575248.2

(51) Int. Cl.
 *B32B 7/023* (2019.01)
 *G06F 1/16* (2006.01)
(52) U.S. Cl.
 CPC ........ *B32B 7/023* (2019.01); *B32B 2307/418* (2013.01); *B32B 2307/73* (2013.01); *B32B 2457/20* (2013.01); *G06F 1/1652* (2013.01)
(58) Field of Classification Search
 None
 See application file for complete search history.

(56) References Cited

U.S. PATENT DOCUMENTS

2003/0085652 A1* 5/2003 Weaver ............... H01L 51/5262
                                                                313/506
2015/0226881 A1* 8/2015 Takahashi ................ G02B 1/18
                                                                359/580

(Continued)

FOREIGN PATENT DOCUMENTS

CN          1584635 A       2/2005
CN          1821653 A       8/2006

(Continued)

OTHER PUBLICATIONS

State Intellectual Property Office of the People's Republic of China, Office Action dated Dec. 28, 2021, issued in corresponding Application No. 202011575248.2 filed on Dec. 28, 2020, 24 pages.

*Primary Examiner* — Anthony J Frost
(74) *Attorney, Agent, or Firm* — Christensen O'Connor Johnson Kindness PLLC

(57) ABSTRACT

A composite film module, a method for manufacturing the same, a light collecting device and a display device are provided. Each composite layers includes first and second refractive index layers, and a refractive index of the first refractive index layer is greater than that of the second refractive index layer. One first refractive index layer is provided between every two adjacent second refractive index layers. Along a thickness direction of a composite film module, first and second composite layers are adjacent to each other, a refractive index of the first refractive index layer in the first composite layer is greater than that of the first refractive index layer in the second composite layer, and the refractive index of the second refractive index layer in the first composite layer is greater than that of the second refractive index layer in the second composite layer.

16 Claims, 19 Drawing Sheets

(56) References Cited

U.S. PATENT DOCUMENTS

2018/0217299 A1* 8/2018 Takahashi .............. G02B 1/115
2018/0321425 A1* 11/2018 Hart ................... C03C 17/3435

FOREIGN PATENT DOCUMENTS

| CN | 207336790 U | 5/2018 |
| CN | 106537192 B | 3/2019 |
| CN | 110989051 A | 4/2020 |
| CN | 210401939 U | 4/2020 |
| WO | 2014041743 A1 | 3/2014 |

* cited by examiner

COMPOSITE FILM MODULE, METHOD FOR MANUFACTURING THE SAME, LIGHT COLLECTING DEVICE AND DISPLAY DEVICE

CROSS-REFERENCE TO RELATED APPLICATIONS

The present disclosure claims priority to Chinese Patent Application No. 202011575248.2, filed on Dec. 28, 2020, the content of which is incorporated herein by reference in its entirety.

TECHNICAL FIELD

The present disclosure relates to the field of optical technology, and in particular, to a composite film module, a method for manufacturing the composite film module, a light collecting device, and a display device.

BACKGROUND

Various optical devices have requirements for decreasing reflected light and/or increasing an intensity of transmitted light. For example, in the field of display technology, in order to increase a contrast of a display image, a reflection reducing film is often provided at a light-exiting side of the display device to reduce reflected light. Also, in the field of optical lenses, in order to increase an intensity of light incident into the lens and decrease an intensity of light reflected at a surface of the lens, a reflection reducing and transmittance increasing film is often provided on a surface of the optical lens to decrease an intensity of reflected light and increase an intensity of transmitted light. In addition, in the field of photovoltaic power generation, in order to increase an intensity of light incident to a photovoltaic element and improve a photoelectric conversion efficiency of the photovoltaic element, a reflection reducing and transmittance increasing film is often provided on a surface of the photovoltaic element. However, such reflection reducing films still have problems, such as high reflective indexes.

SUMMARY

In an aspect, an embodiment of the present disclosure provides a composite film module including at least two composite layers. Each of the at least two composite layers includes a first refractive index layer and a second refractive index layer that are stacked, and a refractive index of the first refractive index layer is greater than a refractive index of the second refractive index layer. One of the first refractive index layers of the at least two composite layers is provided between every two adjacent second refractive index layers of the second refractive index layers of the at least two composite layers, and one of the second refractive index layers is provided between every two adjacent first refractive index layers of the first refractive index layers. Along a thickness direction of the composite film module, a first composite layer and a second composite layer of the at least two composite layers are adjacent to each other. The refractive index of the first refractive index layer of the first composite layer is greater than the refractive index of the first refractive index layer of the second composite layer, and the refractive index of the second refractive index layer of the first composite layer is greater than the refractive index of the second refractive index layer of the second composite layer; or the refractive index of the first refractive index layer of the first composite layer is greater than the refractive index of the first refractive index layer of the second composite layer, and the refractive index of the second refractive index layer of the first composite layer is equal to the refractive index of the second refractive index layer of the second composite layer; or the refractive index of the first refractive index layer of the first composite layer is equal to the refractive index of the first refractive index layer of the second composite layer, and the refractive index of the second refractive index layer of the first composite layer is greater than the refractive index of the second refractive index layer of the second composite layer.

In another aspect, an embodiment of the present disclosure provides a method for manufacturing a composite film module, the method includes providing a substrate; and forming, by thin-film deposition or spraying, at least two composite layers on a side of the substrate to cover the substrate. The composite film module includes the at least two composite layers, each of the at least two composite layers includes a first refractive index layer and a second refractive index layer that are stacked, and the first refractive index layer has a refractive index greater than a refractive index of the second refractive index layer. One of the first refractive index layers of the at least two composite layers is provided between every two adjacent second refractive index layers of the second refractive index layers of the at least two composite layers, and one of the second refractive index layers is provided between every two adjacent first refractive index layers of the first refractive index layers. Along a thickness direction of the composite film module, a first composite layer and a second composite layer of the at least two composite layers are adjacent to each other. The refractive index of the first refractive index layer of the first composite layer is greater than the refractive index of the first refractive index layer of the second composite layer, and the refractive index of the second refractive index layer of the first composite layer is greater than the refractive index of the second refractive index layer of the second composite layer; or the refractive index of the first refractive index layer of the first composite layer is greater than the refractive index of the first refractive index layer of the second composite layer, and the refractive index of the second refractive index layer of the first composite layer is equal to the refractive index of the second refractive index layer of the second composite layer; or the refractive index of the first refractive index layer of the first composite layer is equal to the refractive index of the first refractive index layer of the second composite layer, and the refractive index of the second refractive index layer of the first composite layer is greater than the refractive index of the second refractive index layer of the second composite layer.

In yet another aspect, an embodiment of the present disclosure provides a display device, and the display device includes a display panel and a composite film module disposed at a light-exiting side of the display panel. The composite film module includes at least two composite layers. Each of the at least two composite layers includes a first refractive index layer and a second refractive index layer that are stacked, and a refractive index of the first refractive index layer is greater than a refractive index of the second refractive index layer. One of the first refractive index layers of the at least two composite layers is provided between every two adjacent second refractive index layers of the second refractive index layers of the at least two composite layers, and one of the second refractive index layers is provided between every two adjacent first refractive index layers of the first refractive index layers. Along a thickness direction of the composite film module, a first composite layer and a second composite layer of the at least two composite layers are adjacent to each other. The refractive index of the first refractive index layer of the first composite layer is greater than the refractive index of the first refractive index layer of the second composite layer, and the refractive index of the second refractive index layer of the first composite layer is greater than the refractive index of the second refractive index layer of the second composite layer; or the refractive index of the first refractive index layer of the first composite layer is greater than the refractive index of the first refractive index layer of the second composite layer, and the refractive index of the second refractive index layer of the first composite layer is equal to the refractive index of the second refractive index layer of the second composite layer; or the refractive index of the first refractive index layer of the first composite layer is equal to the refractive index of the first refractive index layer of the second composite layer, and the refractive index of the second refractive index layer of the first composite layer is greater than the refractive index of the second refractive index layer of the second composite layer. The refractive index of the first refractive index layer of the composite film module closest to the light collecting element is greater than or equal to the refractive index of each of other first refractive index layers of the first refractive index layers of the composite film module.

BRIEF DESCRIPTION OF DRAWINGS

In order to more clearly illustrate technical solutions in embodiments of the present disclosure, the accompanying drawings used in the embodiments are briefly introduced as follows. It should be noted that the drawings described as follows are merely part of the embodiments of the present disclosure, and other drawings can also be obtained by those skilled in the art.

DESCRIPTION OF EMBODIMENTS

For better illustrating technical solutions of the present disclosure, embodiments of the present disclosure will be described in detail as follows with reference to the accompanying drawings.

It should be noted that, the described embodiments are merely exemplary embodiments of the present disclosure, which shall not be interpreted as providing limitations to the present disclosure. All other embodiments obtained by those skilled in the art according to the embodiments of the present disclosure are within the scope of the present disclosure.

The terms used in the embodiments of the present disclosure are merely for the purpose of describing particular embodiments but not intended to limit the present disclosure. Unless otherwise noted in the context, the singular form expressions "a", "an", "the" and "said" used in the embodiments and appended claims of the present disclosure are also intended to represent plural form expressions thereof.

It should be understood that the term "and/or" used herein is merely an association relationship describing associated objects, indicating that there may be three relationships, for example, A and/or B may indicate that three cases, i.e., A alone, A and B, B alone. In addition, the character "/" herein generally indicates that the related objects before and after the character form an "or" relationship.

It should be understood that although the layers having different refractive indexes can be described using the terms of "first", "second", etc., in the embodiments of the present disclosure, the layers having different refractive indexes will not be limited to these terms. These terms are merely used to distinguish layers having different refractive indexes from one another. For example, without departing from the scope of the embodiments of the present disclosure, a first refractive index layer can also be referred to as a second refractive index layer, similarly, a second refractive index layer can also be referred to as a first refractive index layer.

Figure 1:
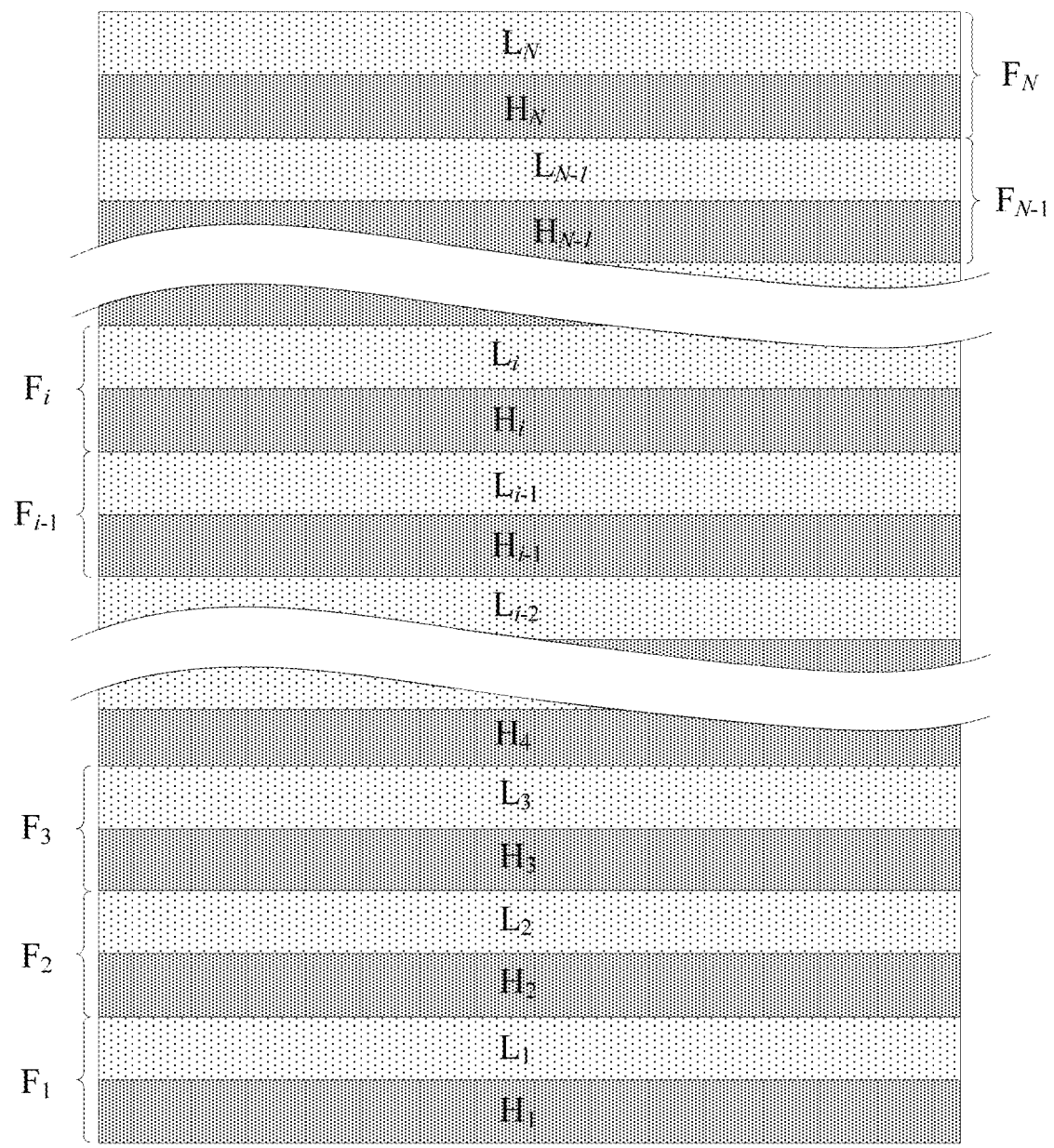
FIG. 1 is a cross-sectional view of a composite film module according to an embodiment of the present disclosure.

An embodiment of the present disclosure provides a composite film module, and the composite film module includes at least two composite layers F. FIG. 1 is a cross-sectional view of a composite film module according to an embodiment of the present disclosure. As shown in FIG. 1, the composite film module 100 includes N composite layers, and N is greater than or equal to 2. In order to distinguish the composite layers, as shown in FIG. 1, different composite layers are distinguished from one another by a subscript i. For example, a composite layer $F_i$ represents an $i^{th}$ composite layer of the composite film module 100 along a thickness direction of the composite film module 100, and a composite layer $F_{i+1}$ represents an $(i+1)^{th}$ composite layer in the composite film module 100 along the thickness direction of the composite film module 100. In an embodiment of the present disclosure, each composite layer $F_i$ includes a first refractive index layer $H_i$ and a second refractive index layer $L_i$ that are stacked, and the first refractive index layer $H_i$ has a first refractive index greater than a second refractive index $L_i$ of the second refractive index layer.

In addition, in an embodiment of the present disclosure, one first refractive index layer is provided between any two adjacent second refractive index layers, and one second refractive index layer is provided between any two adjacent first refractive index layers. As shown in FIG. 1, one first refractive index layer $H_i$ is provided between the second refractive index layer $L_{i-1}$ and the second refractive index layer $L_i$, and one second refractive index layer $L_{i-1}$ is provided between the first refractive index layer $H_{i-1}$ and the first refractive index layer $H_i$. That is, in the composite film module 100, the first refractive index layer and the second refractive index layer are alternately arranged along the thickness direction of the composite film module 100.

In addition, in the thickness direction of the composite film module 100, two of the composite layers are adjacent to each other, an equivalent refractive index of a former composite layer of the two adjacent composite layers is greater than an equivalent refractive index of a latter composite layer of the two adjacent composite layers. The former composite layer of the two adjacent composite layers also can be referred to a first composite layer of the two adjacent composite layers. The latter composite layer of the two adjacent composite layers also can be referred to a second composite layer of the two adjacent composite layers. The composite layer is equivalent to a single layer, the light is refracted after passing through the single layer in a degree same as a degree in which light is refracted after passing through the composite layer, and the equivalent refractive of the single layer is the equivalent refractive index of the composite layer. The equivalent refractive index of the composite layer can be calculated according to the following process.

For a single layer, its characteristic matrix is expressed as:

$$\begin{bmatrix} \cos(\delta) & \dfrac{i}{\eta}\sin(\delta) \\ i\eta\sin(\delta) & \cos(\delta) \end{bmatrix},$$

where $\delta = \dfrac{2N\cos(\theta)}{\lambda}$, $$\eta = \begin{cases} 2N\cos(\theta), & S \text{ light component} \\ \dfrac{N}{\cos(\theta)}, & P \text{ light component} \end{cases},$$

$N=n-ik$, n denotes a refractive index of the layer, k denotes an extinction coefficient, θ denotes an incident angle, i denotes a unit imaginary number, d denotes a thickness of the layer, and λ denotes a reference wavelength.

For a composite layer including two single layers, the number of the single layer close to an incident medium is represented by 1 and the number of the single layer far away from the incident medium is represented by 2, an action matrix can be simplified to a characteristic matrix form of a single layer, which can be expressed as:

$$\prod_{j=1}^{} \begin{bmatrix} \cos(\delta_j) & \dfrac{i}{\eta_j}\sin(\delta_j) \\ i\eta_j\sin(\delta_j) & \cos(\delta_j) \end{bmatrix} = \qquad (1)$$

$$\begin{bmatrix} \cos(\delta_1) & \dfrac{i}{\eta_1}\sin(\delta_1) \\ i\eta_1\sin(\delta_1) & \cos(\delta_1) \end{bmatrix} \begin{bmatrix} \cos(\delta_2) & \dfrac{i}{\eta_2}\sin(\delta_2) \\ i\eta_2\sin(\delta_2) & \cos(\delta_2) \end{bmatrix} =$$

$$\begin{bmatrix} \cos(\delta_1)\cos(\delta_2) & \dfrac{-\sin(\delta_1)\sin(\delta_2)}{\eta_1\eta_2} \\ -\eta_1\eta_2\sin(\delta_1)\sin(\delta_2) & \cos(\delta_1)\cos(\delta_2) \end{bmatrix},$$

let it be equal to a general characteristic matrix, that is, let:

$$\begin{bmatrix} \cos(\delta_1)\cos(\delta_2) & \dfrac{-\sin(\delta_1)\sin(\delta_2)}{\eta_1\eta_2} \\ -\eta_1\eta_2\sin(\delta_1)\sin(\delta_2) & \cos(\delta_1)\cos(\delta_2) \end{bmatrix} = \begin{bmatrix} \cos(\delta) & \dfrac{i}{\eta}\sin(\delta) \\ i\eta\sin(\delta) & \cos(\delta) \end{bmatrix}. \quad (2)$$

For example, the light is incident in a direction perpendicular to the composite layer, that is, θ=0°, then it satisfies:

$$\delta_j = \frac{2N_j d_j}{\lambda};$$

$$\eta_j = N_j = n_j - ik_j.$$

Then, it is substituted into the formula (2) to obtain:

$$\begin{cases} \cos\left(\dfrac{2N_1 d_1}{\lambda}\right)\cos\left(\dfrac{2N_2 d_2}{\lambda}\right) = \cos\left(\dfrac{2Nd}{\lambda}\right) \\ -N_1 N_2 \sin\left(\dfrac{2N_1 d_1}{\lambda}\right)\sin\left(\dfrac{2N_2 d_2}{\lambda}\right) = iN\sin\left(\dfrac{2Nd}{\lambda}\right). \\ \dfrac{-\sin\left(\dfrac{2N_1 d_1}{\lambda}\right)\sin\left(\dfrac{2N_2 d_2}{\lambda}\right)}{N_1 N_2} = \dfrac{i}{N}\sin\left(\dfrac{2Nd}{\lambda}\right) \end{cases} \quad (3)$$

Therefore, in a composite layer formed by multiple single layers, if the refractive index n, a color dispersion coefficient k, and a thickness d of the single layer are known, the equivalent refractive index of the composite layer can be obtained according to the formula (3).

Taking an orientation shown in FIG. 1 as an example, in an embodiment of the present disclosure, the thickness direction of the composite film module 100 can be a direction from $L_N$ to $H_1$, or can be a direction from $H_1$ to $L_N$, which will not be limited by the embodiments of the present disclosure.

Taking the thickness direction of the composite film module 100 being the direction from $L_N$ to $H_1$ as an example, then the two adjacent composite layers can be a former composite layer $F_{i-1}$ and a latter composite layer $F_i$. That is, in this embodiment of the present disclosure, it is possible an equivalent refractive index $n_i$ of the composite layer $F_i$ is greater than an equivalent refractive index $n_{i-1}$ of the composite layer $F_{i-1}$.

Taking the thickness direction of the composite film module 100 being the direction from $H_1$ to $L_N$ as an example, then the two adjacent composite layers can be a former composite layer $F_{i-1}$ and a latter composite layer $F_i$. That is, in this example, the equivalent refractive index $n_i$ of the composite layer $F_{i-1}$ is greater than the equivalent refractive index $n_i$ of the composite layer $F_i$.

In the following, unless otherwise specified, the direction from $H_1$ to $L_N$ is taken as the thickness direction of the composite film module.

When the composite film module 100 is applied to an optical component, the orientation of the composite film module 100 is adjusted in such a manner that the composite layer having a smaller equivalent refractive index in the composite film module 100 is located at a side of the composite film module 100 close to incident light. When light passes through air to enter the composite film module 100, the light will pass through air having the smallest refractive index, then through the composite layer $F_i$ having a smaller equivalent refractive index, and then exit through the composite layer $F_{i-1}$ having a relatively high equivalent refractive index. That is, in a process where light passes through air to enter the composite film module 100 and propagates in the composite film module 100, the light actually passes through a medium having a gradually increasing refractive index, so that the influence of an interface between air and the composite film module 100 and an interface between the media having different refractive indexes inside the composite film module 100 on the light is reduced, thereby decreasing light intensity of the reflected light that is reflected by the composite film module 100 and increasing light intensity of the light passing through the composite film module 100.

Moreover, in a microscopic view, when light passes through the composite layer $F_i$ or the composite layer $F_{i-1}$, since each of the two composite layers includes two single layers having different refractive indexes, according to a principle of film interference, the different reflected light formed when incident light passes through any composite layer can counteract their interferences. Therefore, a reflective index of the light can be further reduced after passing through the composite film module. The second refractive index layer having a relatively small refractive index is arranged at a side of the composite layer close to the incident light, so that an interface between the media that the light incident onto the corresponding composite layer passes through during a propagation process in the composite layer can weaken the light incident onto the corresponding composite layer, thereby decreasing a degree of reflection of the light during the propagation process.

In order to make the equivalent refractive index of the former composite layer be greater than the equivalent refractive index of the latter composite layer, the present disclosure provides a plurality of solutions.

Figure 2:
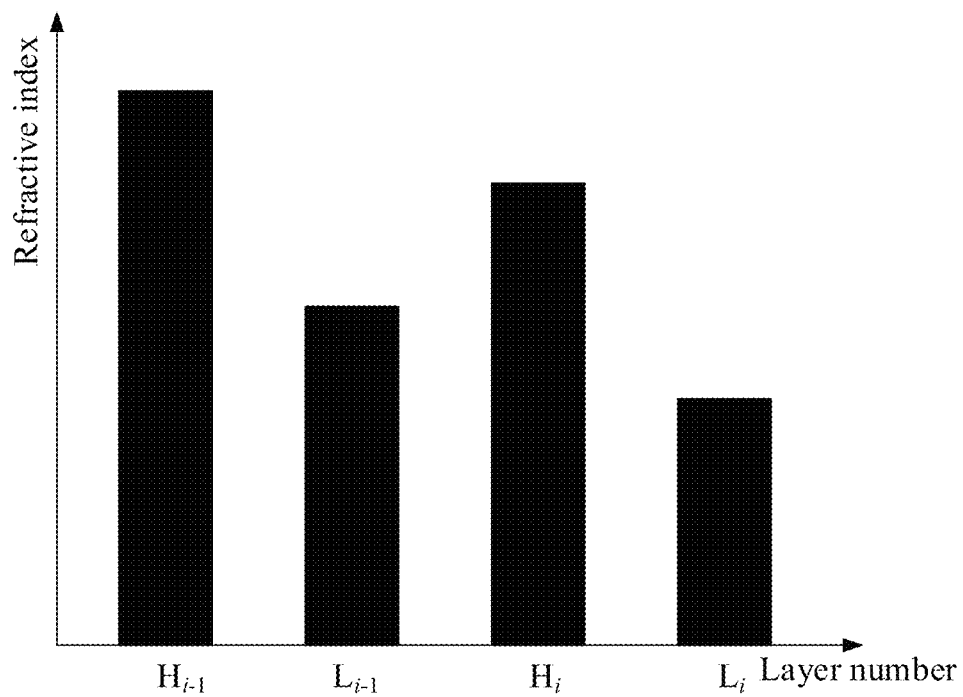
FIG. 2 is a schematic diagram illustrating refractive indexes of first refractive index layers and second refractive index layers in two adjacent composite layers of a composite film module according to an embodiment of the present disclosure.

FIG. 2 is a schematic diagram illustrating the refractive indexes of the first refractive index layers and the second refractive index layers in two adjacent composite layers of a composite film module provided by an embodiment of the present disclosure. For example, in an embodiment, as shown in FIG. 2, the refractive index of the first refractive index layer $H_{i-1}$ of the former composite layer is greater than the refractive index of the first refractive index layer $H_i$ in the latter composite layer, and the refractive index of the second refractive index layer $L_{i-1}$ in the former composite layer is greater than the refractive index of the second refractive index layer $L_i$ in the latter composite layer.

Figure 3:
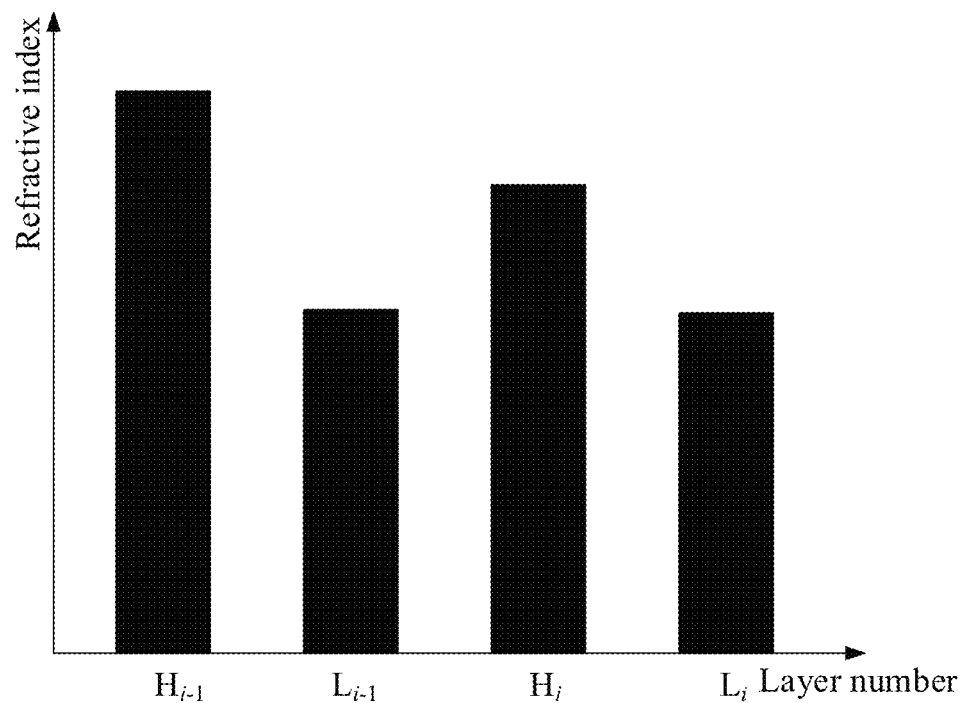
FIG. 3 is a schematic diagram illustrating the refractive indexes of the first refractive index layers and the second refractive index layers in two adjacent composite layers in of a composite film module according to an embodiment of the present disclosure.

FIG. 3 is a schematic diagram illustrating the refractive indexes of the first refractive index layers and the second refractive index layers in two adjacent composite layers in another composite film module according to another embodiment of the present disclosure. In an embodiment, as shown in FIG. 3, the refractive index of the first refractive index layer $H_{i-1}$ in the former composite layer is greater than the refractive index of the first refractive index layer $H_i$ in the latter composite layer, and the refractive index of the second refractive index layer $L_{i-1}$ in the former composite layer is equal to the refractive index of the second refractive index layer $L_i$ in the latter composite layer.

Figure 4:
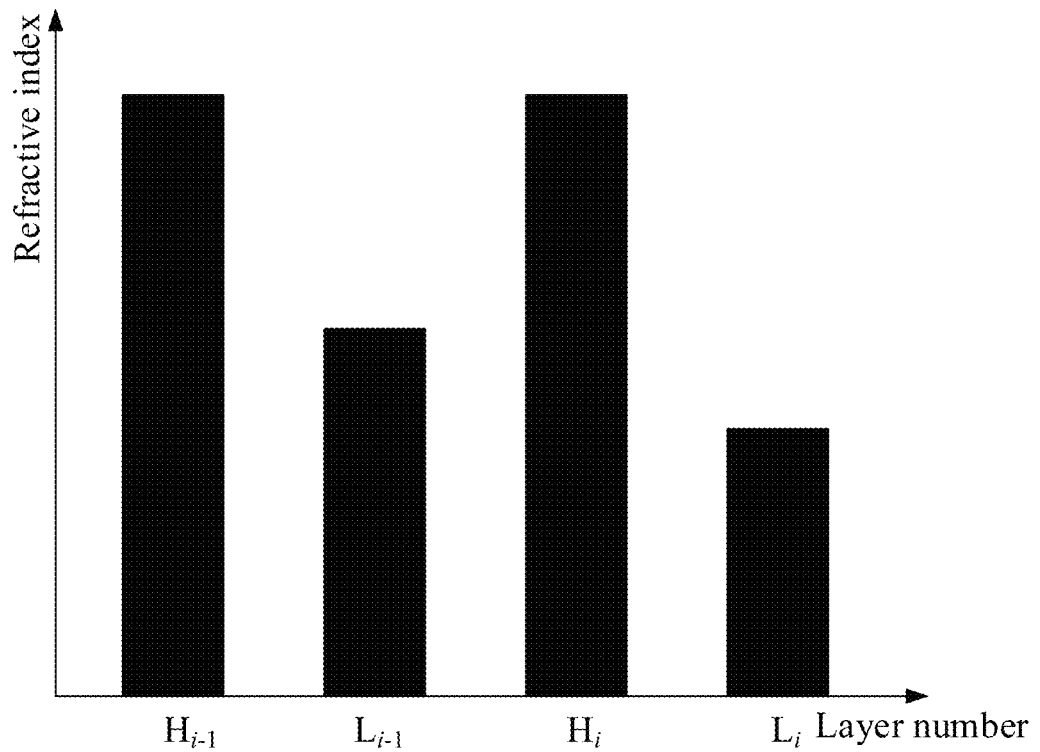
FIG. 4 is a schematic diagram illustrating the refractive indexes of the first refractive index layers and the second refractive index layers in two adjacent composite layers in of a composite film module according to an embodiment of the present disclosure.

FIG. 4 is a schematic diagram illustrating the refractive indexes of the first refractive index layers and the second refractive index layers in two adjacent composite layers in still another composite film module according to another embodiment of the present disclosure. In an embodiment, as shown in FIG. 3, the refractive index of the first refractive index layer $H_{i-1}$ in the former composite layer is equal to the refractive index of the first refractive index layer $H_i$ in the latter composite layer, and the refractive index of the second refractive index layer $L_{i-1}$ in the former composite layer is greater than the refractive index of the second refractive index layer $L_i$ in the latter composite layer.

By adopting each of the implementations described above, for the two adjacent composite layers $F_i$ and $F_{i-1}$, the equivalent refractive index of the former composite layer $F_{i-1}$ can be greater than the equivalent refractive index of the latter composite layer $F_i$.

For example, in an embodiment of the present disclosure, in the aforementioned two adjacent composite layers, based on that the equivalent refractive index of the former composite layer is greater than the equivalent refractive index of the latter composite layer, the refractive index of the second refractive index layer in the former composite layer can be smaller than the refractive index of the first refractive index layer in the latter composite layer. For example, as shown in FIGS. 2-4, the refractive index of the second refractive index layer $L_{i-1}$ in the composite layer $F_{i-1}$ is smaller than the refractive index of the first refractive index layer $H_i$ in the composite layer $F_i$. In other words, the refractive indexes of the two adjacent composite layers have an oscillatory decreasing trend. Due to the limitation on types of materials having a relatively small refractive index, when this configuration is adopted, the types of layers that can be selected can be increased when forming the composite film module, thereby being beneficial to select from the related optical materials. In a case that a difference between the equivalent refractive indexes of two adjacent composite layers is constant, compared to the scheme that the refractive index of the second refractive index layer in the former composite layer is greater than the refractive index of the first refractive index layer in the latter composite layer, the refractive index of the composite film module 100 has an oscillatory decreasing trend, and there is no need to provide a large number of layers in the composite layer. In other words, in a case that the number of layers in all composite layers is of a same value and the refractive index of all layers of all composite layers is of a same value, the difference between the equivalent refractive indexes of the two composite layers is relatively small. That is, a change of refractive index of the two composite layers can be gentle, thereby being more beneficial to reflection decrease by weakening the difference between interfaces between the two composite layers. Therefore, by adopting the embodiment of the present disclosure, it is beneficial to decrease a thickness of the composite film module and simplifying a manufacturing process of the composite film module, as well as achieving a reflection decrease effect of the composite film module.

When the composite film module 100 is applied to some optical devices, such as mobile phones, computers, cameras, etc., a non-opaque layer such as glass or acrylic are usually provided on the surface of the optical device. The material of the non-opaque layer such as glass or acrylic generally has a refractive index of approximately 1.5, therefore, in order to achieve reflection decrease, the equivalent refractive index of the composite layer can be smaller than 1.5. In the related art, the types of optical layers having a refractive index smaller than 1.5 are very limited. Therefore, by adopting the embodiment of the present disclosure, the refractive index of the composite film module can have an oscillatory decreasing trend along the thickness direction of the composite film module, so that a large number of types of materials can be selected.

In an embodiment, the refractive index of the second refractive index layer in the former composite layer is greater than the refractive index of the first refractive index layer in the latter composite layer, that is, in the composite film module 100, the respective single layers have gradually decreased respective refractive indexes along the thickness direction. With this configuration, the composite film module can be applied to devices whose surfaces are formed by materials having relatively large refractive indexes, such as solar cells. In solar cells, its surfaces are generally a reaction layer made of Si whose refractive index is within a range of 3 to 4. There are a large number of materials having a refractive index smaller than the refractive index of Si. Therefore, it is easy to use the materials in the related art to form a composite film module having a relatively small reflective index.

In an example, along the thickness direction of the composite film module 100, the layers in every two adjacent composite layers are set to have an aforementioned change trend in the refractive index, so as to decrease the reflective index of the composite film module 100. For example, in every two adjacent composite layers, the refractive index of the first refractive index layer in the former composite layer is greater than the refractive index of the first refractive index layer in the latter composite layer, and the refractive index of the second refractive index layer in the former composite layer is greater than the refractive index of the second refractive index layer in the latter composite layer. In another embodiment, in every two adjacent composite layers, the refractive index of the first refractive index layer in the former composite layer is greater than the refractive index of the first refractive index layer in the latter composite layer, and the refractive index of the second refractive index layer in the former composite layer is equal to the refractive index of the second refractive index layer in the latter composite layer. In another embodiment, in every two adjacent composite layers, the refractive index of the first refractive index layer in the former composite layer is equal to the refractive index of the first refractive index layer in the latter composite layer, and the refractive index of the second refractive index layer in the former composite layer is greater than the refractive index of the second refractive index layer in the latter composite layer. That is, $n_{H1} \geq n_{H2} \geq n_{H3} > \ldots n_{H(i-1)} \geq n_{Hi} \geq n_{H(i+1)} \geq \ldots \geq n_{HN}$, and $n_{L1} \geq n_{L2} \geq n_{L3} \geq \ldots \geq n_{L(i-1)} \geq n_{Li} \geq n_{L(i+1)} \geq \ldots \geq n_{LN}$. Here, $n_{Hi}$ denotes the refractive index of the first refractive index layer of the $i^{th}$ composite layer of the composite film module 100 along the thickness direction of the composite film module 100, and $n_{Li}$ denotes the refractive index of the second refractive index layer of the $i^{th}$ composite layer of the composite film module 100 along the thickness direction of the composite film module 100.

In an embodiment of the present disclosure, in every two adjacent composite layers, the refractive index of the second refractive index layer of the former composite layer is smaller than the refractive index of the first refractive index layer of the latter composite layer, that is, $n_{Li} < n_{H(i+1)}$, so as to decrease the thickness of the composite film module 100 and have more selections in types of layers on the basis of decreasing the reflective index of the composite film module 100.

In an example, on the basis of the equivalent refractive index of the former composite layer being greater than the equivalent refractive index of the latter composite layer, in three adjacent composite layers arranged along the thickness direction of the composite film module 100, the configuration of the refractive indexes of a first one of the three adjacent composite layers and a second one of the three adjacent composite layers is different from the configuration of the refractive indexes of the second one of the three adjacent composite layers and a third one of the three adjacent composite layers. For example, when the refractive indexes of the respective layers in the first one of the three adjacent composite layers and the second one of the three adjacent composite layers are configured according to FIG. 2, the refractive indexes of the respective layers in the second one of the three adjacent composite layers and the third one of the three adjacent composite layers can be configured according to FIG. 3 or FIG. 4. In another embodiment, when the refractive indexes of the respective layers in the first one of the three adjacent composite layers and the second one of the three adjacent composite layers are configured according to FIG. 3 or FIG. 4, the refractive indexes of the respective layers in the second one of the three adjacent composite layers and the third one of the three adjacent composite layers can be configured according to FIG. 2. The present disclosure will not limit the configurations of the refractive index of layers to the above embodiment.

In an embodiment, in three adjacent composite layers, the refractive index of the first refractive index layer in the second one of the three adjacent composite layers is equal to the refractive index of the first refractive index layer in the first one of the three adjacent composite layers (that is, the refractive indexes of the first refractive index layers and the second refractive index layers in the first one of the three adjacent composite layers and the second one of the three adjacent composite layers are configured according to FIG. 4), and the refractive index of the second refractive index layer in the second one of the three adjacent composite layers is equal to the refractive index of the second refractive index layer in the third one of the three adjacent composite layers (that is, the refractive indexes of the first refractive index layers and the second refractive index layers in the second one of the three adjacent composite layers and the third one of the three adjacent composite layers are configured according to FIG. 3). In this case, the refractive index of the second refractive index layer in the first one of the three adjacent composite layers can be greater than or equal to the refractive index of the first refractive index layer in the third one of the three adjacent composite layers. For example, the refractive index of the second refractive index layer in the first one of the three adjacent composite layers can be equal to the refractive index of the first refractive index layer in the third one of the three adjacent composite layers. With such configuration, a same material can be used to form the second refractive index layer in the first one of the three adjacent composite layers as well as the first refractive index layer in the third one of the three adjacent composite layers.

Figure 5:
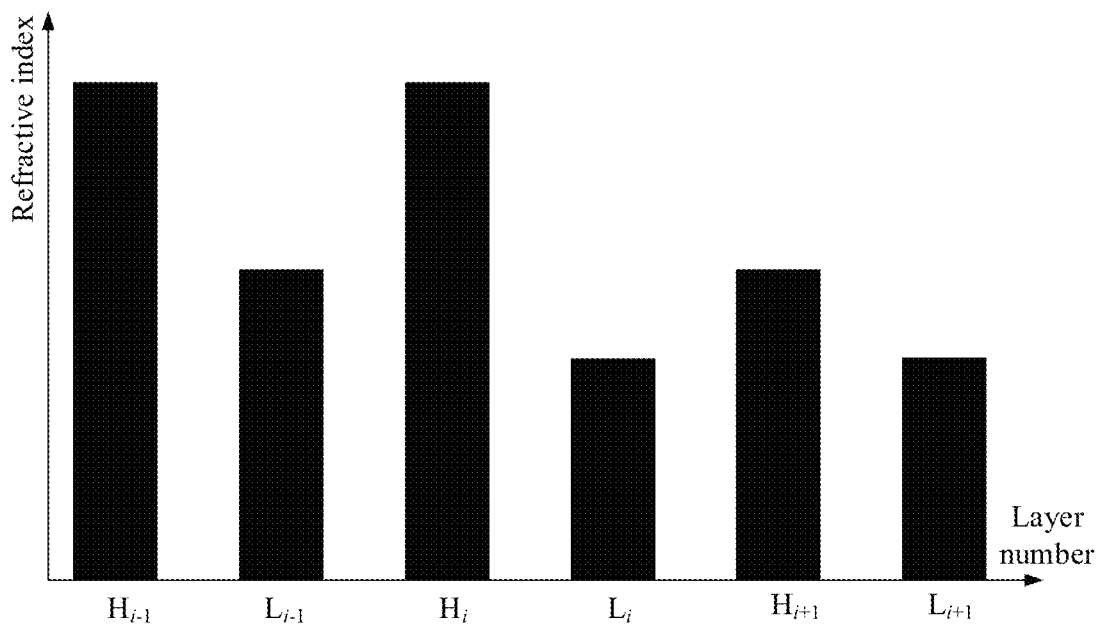
FIG. 5 is a schematic diagram illustrating the refractive indexes of the first refractive index layers and the second refractive index layers in two adjacent composite layers in of a composite film module according to an embodiment of the present disclosure.

FIG. 5 is a schematic diagram illustrating the refractive indexes of the first refractive index layers and the second refractive index layers in three adjacent composite layers in a composite film module according to an embodiment of the present disclosure. In an embodiment, as shown in FIG. 5, the refractive index of the first refractive index layer $H_{i-1}$ in the first one of the three adjacent composite layers is equal to the refractive index of the first refractive index layer $H_i$ in the second one of the three adjacent composite layers, that is, $n_{H(i-1)}=n_{Hi}$; the refractive index of the second refractive index layer $L_{i-1}$ in the first one of the three adjacent composite layers is greater than the refractive index of the second refractive index layer $L_i$ in the second one of the three adjacent composite layers, that is, $n_{L(i-1)}>n_{Li}$; the refractive index of the second refractive index layer $L_i$ in the second one of the three adjacent composite layers is equal to the refractive index of the second refractive index layer $L_{i+1}$ in the third one of the three adjacent composite layers, that is, $n_{Li}=n_{L(i+1)}$; the refractive index of the first refractive index layer $H_i$ in the second one of the three adjacent composite layers is greater than the refractive index of the first refractive index layer $H_{i+1}$ in the third one of the three adjacent composite layers, that is, $n_{Hi}>n_{H(i+1)}$; and the refractive index of the second refractive index layer $L_{i-1}$ in the first one of the three adjacent composite layer is equal to the refractive index of the first refractive index layer $H_{i+1}$ in the third one of the three adjacent composite layer, that is, $n_{L(i-1)}=n_{H(i+1)}$.

It can be seen that, by adopting the configuration shown in FIG. 5, on the basis of the equivalent refractive indexes of the three adjacent composite layers decreasing gradually, only three kinds of materials can be used to form six layers. The first refractive index layer $H_{i-1}$ in the first composite layer and the first refractive index layer $H_i$ in the second composite layer can be made of a same material, the second refractive index layer $L_{i-1}$ in the first composite layer and the first refractive index layer $H_{i+1}$ in the third composite layer can be made of a same material, and the second refractive index layer $L_{i-1}$ in the first composite layer and the second refractive index layer $L_i$ in the second composite layer can be made of a same material. In this way, the types of layers in the composite film module can be selected in a wide range, thereby making the composite film module highly implementable.

Figure 6:
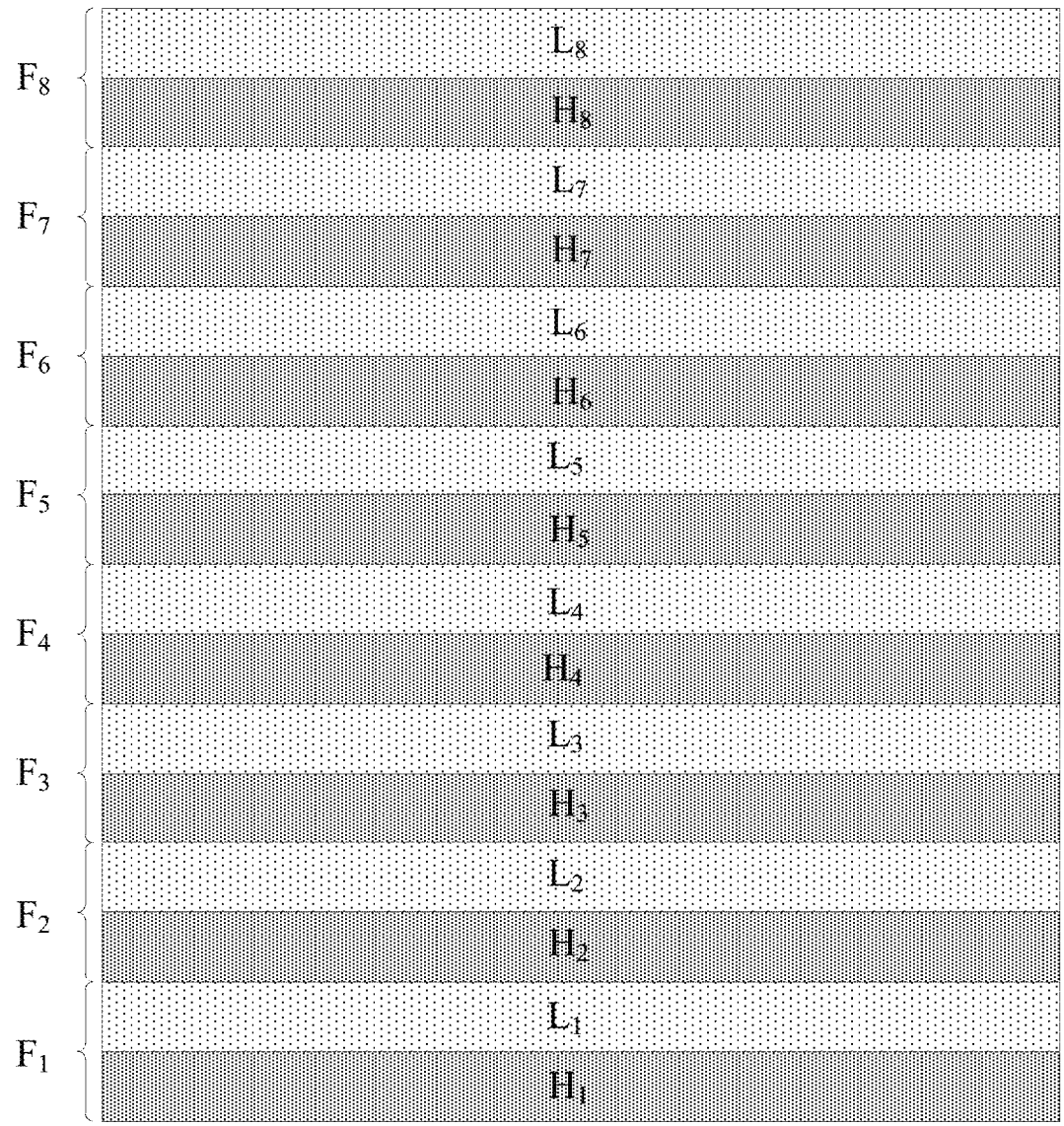
FIG. 6 is a cross-sectional view of another composite film module according to an embodiment of the present disclosure.

In an embodiment of the present disclosure, the number N of composite layers in the composite film module 100 satisfies $2 \le N \le 50$. In this way, the composite film module has a relatively low reflective index, meanwhile, the number of composite layers is not excessively greater, so that the thickness of the composite film module will not be excessively large and a manufacturing process of the composite film module can be simplified. For example, considering both the reflection decrease effect of the composite film module and the number of layers, the number N of composite layers in the composite film module 100 can be set to be smaller than or equal to 10. As shown in FIG. 6, which is a cross-sectional view of a composite film module according to an embodiment of the present disclosure, the composite film module 100 includes eight composite layers, that is, N=8.

In an example, three adjacent composite layers in the composite film module are configured according to FIG. 5, in this case, three composite layers can be taken as one unit, and in two adjacent units, an equivalent refractive index of the third composite layer in the former unit is greater than or equal to an equivalent refractive index of the first composite layer in the latter unit.

Figure 7:
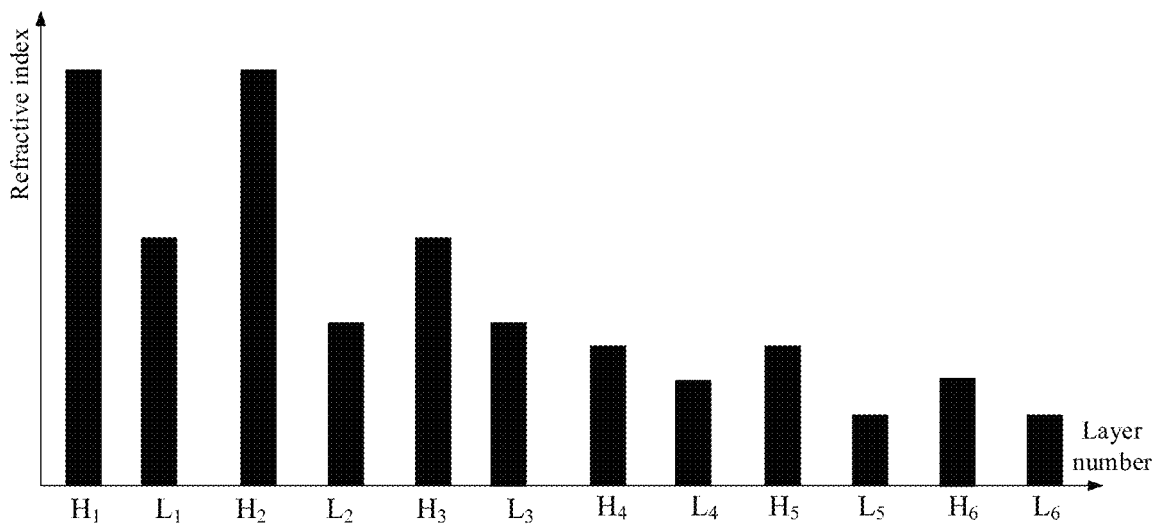
FIG. 7 is a schematic diagram illustrating refractive indexes of first refractive index layers and second refractive index layers in six adjacent composite layers of a composite film module according to an embodiment of the present disclosure.

FIG. 7 is a schematic diagram illustrating the refractive indexes of the first refractive index layers and the second refractive index layers in six adjacent composite layers of a composite film module according to an embodiment of the present disclosure. In an embodiment of the present disclosure, as shown in FIG. 7, the equivalent refractive index of the third composite layer in the former unit is greater than the equivalent refractive index of the first composite layer in the latter unit. The third composite layer in the former unit includes a first refractive index layer $H_3$ and a second refractive index layer $L_3$, and the first composite layer in the latter unit includes a first refractive index layer $H_4$ and a second refractive index layer $L_4$. The refractive index of the first refractive index layer $H_3$ is greater than or equal to the refractive index of the first refractive index layer $H_4$, and the refractive index of the second refractive index layer $L_3$ is greater than or equal to the refractive index of the second refractive index layer $L_4$.

Figure 8:
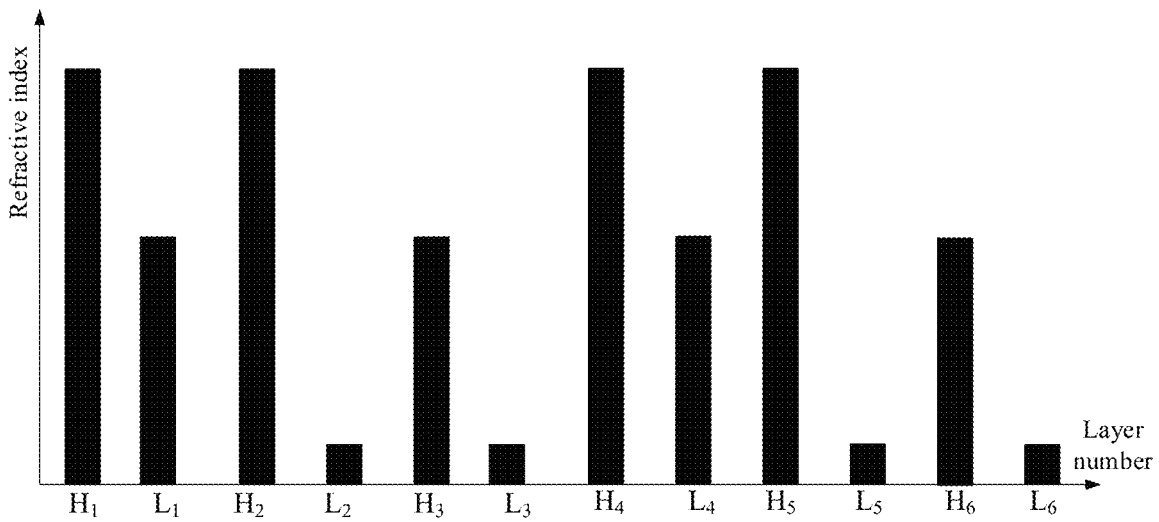
FIG. 8 is a schematic diagram illustrating refractive indexes of first refractive index layers and second refractive index layers in six adjacent composite layers of a composite film module according to an embodiment of the present disclosure.

In an embodiment, the composite layers in two adjacent units have a same refractive index configuration. FIG. 8 is a schematic diagram illustrating the refractive indexes of the first refractive index layers and the second refractive index layers of six adjacent composite layers in another composite film module according to an embodiment of the present disclosure. As shown in FIG. 8, the refractive index of the first refractive index layer $H_4$ in the fourth composite layer is equal to the refractive index of the first refractive index layer $H_1$ in the first composite layer, and the refractive index of the second refractive index layer $L_4$ in the fourth composite layer is equal to the refractive index of the second refractive index layer $L_1$ in the first composite layer; the refractive index of the first refractive index layer $H_5$ in the fifth composite layer is equal to the refractive index of the first refractive index layer $H_2$ in the second composite layer, and the refractive index of the second refractive index layer $L_5$ in the fifth composite layer is equal to the refractive index of the second refractive index layer $L_2$ in the second composite layer; and the refractive index of the first refractive index layer $H_6$ in the sixth composite layer is equal to the refractive index of the first refractive index layer $H_3$ in the third composite layer, and the refractive index of the second refractive index layer $L_6$ in the sixth composite layer is equal to the refractive index of the second refractive index layer $L_3$ in the third composite layer. With such configuration, when light passes through the composite film module, a proportion of the light counteracting interference will be further increased, thereby decreasing the reflective index of the composite film module.

In an embodiment of the present disclosure, the first refractive index layer can be made of at least one of metal, metal nitride, metal oxide, metal oxynitride, silicon nitride, silicon oxide, or silicon oxynitride. For example, the first refractive index layer can be made of at least one of $TiO_2$, $Ta_2O_5$, $Ti_3O_5$, $ZrO_2$, $HfO_2$, Ge, $SiO_xN_y$, or $Nb_2O_5$.

The second refractive index layer can be made of at least one of metal fluoride, silicon oxide, silicon nitride, or silicon oxynitride. For example, the second refractive index layer is made of at least one of $MgF_2$, $SiO_2$, $SiO_xN_y$, $AlF_3$, $YbF_3$, $YF_3$, $BaF_2$, $CeF_2$, $Na_3AlF_6$, or $BaYF_3$.

In an example, the aforementioned first refractive index layer and second refractive index layer can be manufactured by using thin-film deposition or spraying. In an embodiment, the aforementioned thin-film deposition includes chemical vapor deposition process, physical deposition process, magnetron sputtering process and other process.

In an embodiment of the present disclosure, the layers in the composite film module 100 can be made of silicon oxynitride, and different layers can have respective refractive indexes by controlling a nitrogen content and an oxygen content therein. The nitrogen content is a mass percentage of nitrogen, and the oxygen content is a mass percentage of oxygen. For example, in two adjacent composite layers, the first refractive index layer in the former composite layer can be $SiO_{0.2}N_{0.8}$, and the second refractive index layer in the former composite layer can be $SiO_{0.4}N_{0.6}$; and the first refractive index layer in the latter composite layer can be $SiO_{0.3}N_{0.7}$, and the second refractive index layer in the latter composite layer can be $SiO_{0.5}N_{0.5}$. With such configuration, when manufacturing the composite film module 100, the layers can be manufactured by chemical vapor deposition. During manufacturing, a flow rate ratio of different gases can be controlled in the manufacturing cavity to form layers having different refractive indexes. In this way, the process thereof is simplified, and the manufacturing cost is decreased.

For example, the aforementioned composite layer is manufactured by using chemical vapor deposition, with $SiH_4$, $NH_3$, and $N_2O$ being used as reaction gas and $N_2$ being used as gas for maintaining the cavity pressure. In an embodiment of the present disclosure, when manufacturing the aforementioned layers having different refractive indexes, the layers can have required refractive indexes by keeping a total flow rate of the aforementioned multiple gases constant to change a flow rate ratio of $NH_3$ and $N_2O$. For example, when manufacturing $SiO_{0.2}N_{0.8}$, $SiH_4$, $NH_3$, $N_2O$, and $N_2$ can be respectively injected into the manufacturing cavity at a certain flow rate. After reacting for a period, $SiO_{0.2}N_{0.8}$ is formed, then a total flow rate of $SiH_4$, $NH_3$, $N_2O$ and $N_2$ remains unchanged while decreasing a flow rate ratio of $NH_3$ and $N_2O$ till $SiO_{0.3}N_{0.7}$ is formed, and then a total flow rate of $SiH_4$, $NH_3$, $N_2O$ and $N_2$ remains unchanged while decreasing a flow rate ratio of $NH_3$ and $N_2O$ until $SiO_{0.4}N_{0.6}$ is formed.

In the related art, the composite layer usually includes a large-refractive index layer and a small-refractive index layer that are repeatedly and alternately arranged. With such configuration, the material of the large-refractive index layer is different from the material of the small-refractive index layer, therefore, during the manufacturing process, cavities with different materials or even different film forming machines need to be switched back and forth, resulting in higher manufacturing costs. It can be seen that, with the configuration according to the embodiments of the present disclosure, when manufacturing stacked multiple layers having different refractive indexes, the layers having different refractive indexes can be continuously manufactured by using a same equipment, and there is no need to change equipment during this process, thereby effectively decreasing manufacturing costs and increasing the production efficiency.

In an embodiment, two adjacent composite layers in the composite film module 100 satisfy the relationship that: the refractive index of the first refractive index layer in the former composite layer is equal to the refractive index of the first refractive index layer in the latter composite layer, and the refractive index of the second refractive index layer in the former composite layer is greater than the refractive index of the second refractive index layer in the latter composite layer. With such configuration, in two adjacent composite layers, the first refractive index layers can be made of a same material, and the second refractive index layers can be made of silicon oxynitride. The nitrogen content and the oxygen content in each of different second refractive index layers are adjusted according to the requirements for the refractive index, so that the nitrogen content in the second refractive index layer in the former composite layer is greater than the nitrogen content in the second refractive index layer in the latter composite layer. Here, the nitrogen content indicates a mass percentage of nitrogen. With such configuration, when manufacturing the first refractive index layer in each of the composite layers, the layers formed by a same material can be manufactured by using a same process condition, thereby simplifying the process. When manufacturing the second refractive index layer in each of the composite layers, different second refractive index layers can be manufactured by controlling a flow rate of gas in the manufacturing cavity. For example, in two composite layers, the first refractive index layers can be formed by $Nb_2O_5$, the second refractive index layer in the former composite layer can be formed by $SiO_{0.2}N_{0.8}$, and the second refractive index layer in the latter composite layer can be formed by $SiO_{0.7}N_{0.3}$.

In an embodiment of the present disclosure, the refractive index $n_H$ of the first refractive index layer can satisfy the relationship $1.8 \leq n_H \leq 4$, for example, $2 \leq n_H \leq 3$. In this embodiment of the present disclosure, the refractive index of the first refractive index layer is smaller than or equal to 4, so that the first refractive index layer is made of a material not having an excessively large refractive index, thereby decreasing a difference between the refractive index of the first refractive index layer and the refractive index of the second refractive index layer adjacent to the first refractive index layer. As a result, light reflection at an interface between the first refractive index layer and the adjacent second refractive index layer can be decreased. In an embodiment of the present disclosure, the refractive index of the first refractive index layer is greater than or equal to 1.8, so that the types of materials for forming the first refractive index layer can be selected in a wide range, thereby improving implementability of this technical scheme.

The refractive index $n_L$ of the second refractive index layer can satisfies the relationship $1.35 \leq n_L \leq 2$, for example, $1.45 \leq n_L \leq 1.8$. In an embodiment of the present disclosure, the refractive index of the second refractive index layer is greater than or equal to 1.35, so that the types of materials for forming the second refractive index layer can be selected in a wide range, thereby improving implementability of this technical scheme. In an embodiment of the present disclosure, the refractive index of the second refractive index layer is smaller than or equal to 2, so that the second refractive index layer is formed by a material not having an excessively small refractive index, thereby decreasing a difference between the refractive index of the second refractive index layer and the refractive index of the first refractive index layer adjacent to the second refractive index layer. As a result, light reflection at the interface between the second refractive index layer and the adjacent first refractive index layer can be decreased. A thickness $T_H$ of the first refractive index layer satisfies the relationship $1 \text{ nm} \leq T_H \leq 1000 \text{ nm}$, for example, $1 \text{ nm} \leq T_H \leq 500 \text{ nm}$. In an embodiment, the thickness of the first refractive index layer can satisfy the relationship $1 \text{ nm} \leq T_H \leq 200 \text{ nm}$. In an embodiment of the present disclosure, the thickness of the first refractive index layer is greater than or equal to 1 nm, so that it is beneficial to achieve uniformity of the layer thickness of the first refractive index layer at different positions by increasing the thickness of the first refractive index layer when manufacturing the first refractive index layer by a process such as chemical vapor deposition. In this embodiment of the present disclosure, the thickness of the first refractive index layer can be smaller than or equal to 1000 nm, so that the thickness of the composite film module can be decreased.

The refractive index $T_L$ of the second refractive index layer can satisfy the relationship $1 \text{ nm} \leq T_L \leq 1000 \text{ nm}$, for example, $1 \text{ nm} \leq T_L \leq 500 \text{ nm}$. In an embodiment, the thickness of the second refractive index layer can satisfy the relationship $1 \text{ nm} \leq T_L \leq 200 \text{ nm}$. In this embodiment of the present disclosure, the thickness of the second refractive index layer is greater than or equal to 1 nm, so that it is beneficial to achieve uniformity of the layer thickness of the second refractive index layer at different positions by increasing the thickness of the second refractive index layer when manufacturing the second refractive index layer by a process such as chemical vapor deposition. In this embodiment of the present disclosure, the thickness of the second refractive index layer is smaller than or equal to 1000 nm, so that the thickness of the composite film module can be decreased.

Figure 9:
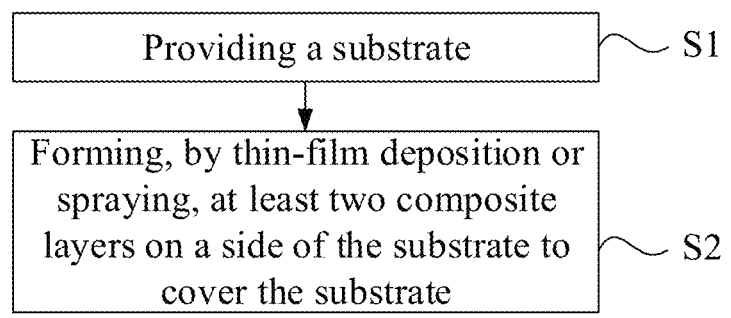
FIG. 9 is a flowchart of a method for manufacturing a composite film module according to an embodiment of the present disclosure.
Figure 10:
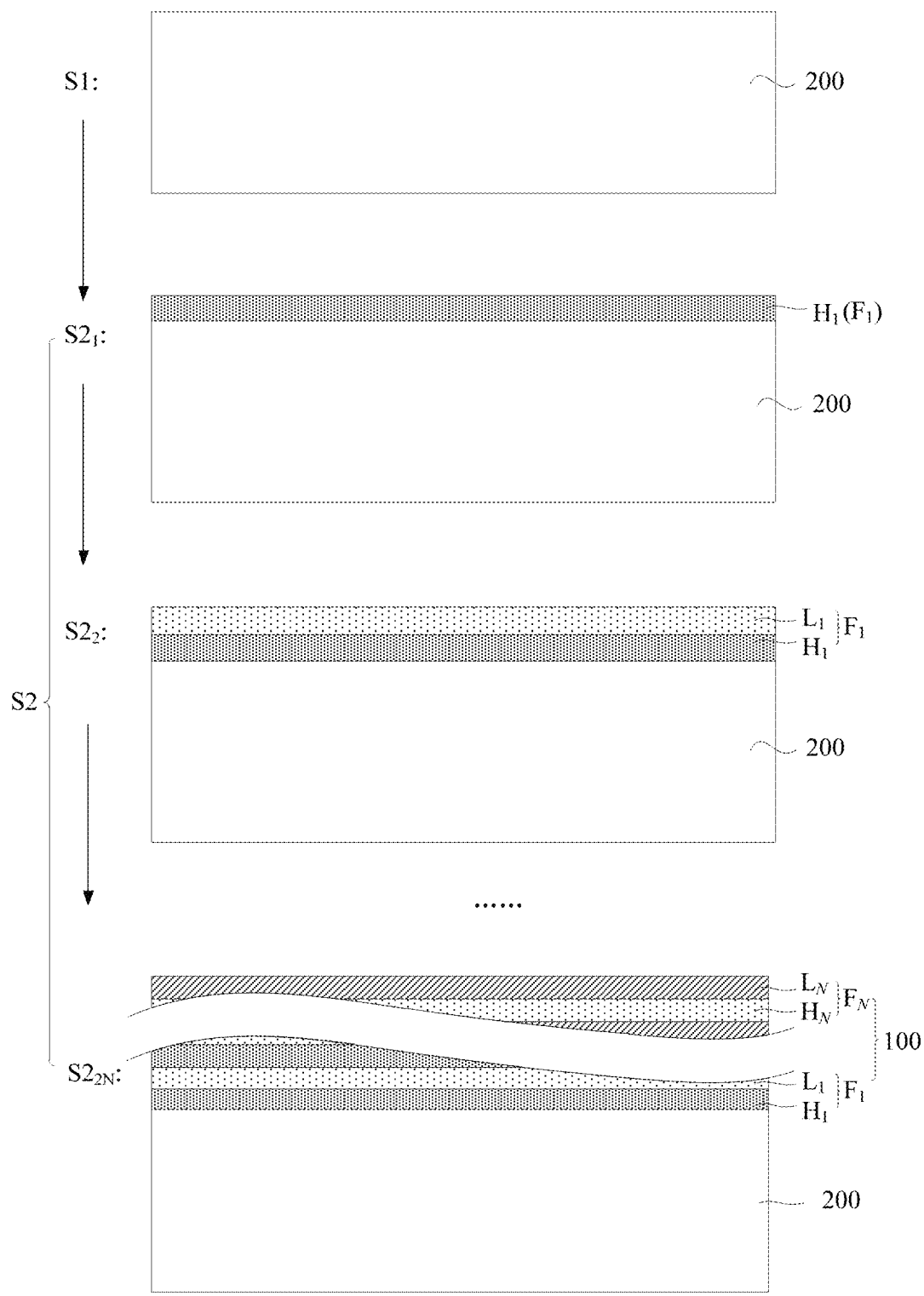
FIG. 10 is a flowchart for manufacturing a composite film module according to an embodiment of the present disclosure.

An embodiment of the present disclosure further provides a method for manufacturing a composite film module. FIG. 9 is a flowchart of a method for manufacturing a composite film module according to an embodiment of the present disclosure. FIG. 10 is a flowchart for manufacturing a composite film module according to an embodiment of the present disclosure. As shown in FIG. 1, FIG. 9 and FIG. 10, the method includes the following steps.

At step S1, a substrate 200 is provided.

At step S2, a composite film module 100 covering the substrate 200 is formed on a side of the substrate 200 by thin-film deposition or spraying. The composite film module 100 includes at least two composite layers. Each composite layer includes a first refractive index layer and a second refractive index layer that are stacked. Here, both the first refractive index layer and the second refractive index layer can be manufactured by thin-film deposition or spraying. During manufacturing, as shown in FIG. 10, the step S2 includes multiple sub-steps. At sub-step $S2_1$, the first refractive index layer $H_1$ of a first composite layer $F_1$ is formed by a film forming process. Then at sub-step $S2_2$, the second refractive index layer $L_1$ of the first composite layer $F_1$ is formed by a film forming process. The second refractive index layer $L_1$ covers the first refractive index layer $H_1$. Then, according to the reflective index of the composite film module 100 that needs to be formed, a composite film module 100 including multiple composite layers can be formed. Each composite layer includes a first refractive index layer and a second refractive index layer that are stacked. In FIG. 10, formation of a composite film module 100 including N composite layers is taken an example for illustration, where step S2 includes sub-step $S2_1$ to sub-step $S2_{2N}$.

The first refractive index layer and the second refractive index layer in the composite film module 100 each have a whole-layer structure and thus can be formed by a single process.

In an embodiment of the present disclosure, the refractive index of the first refractive index layer is greater than the refractive index of the second refractive index layer. One first refractive index layer is provided between every two adjacent second refractive index layers, and one second refractive index layer is provided between every two adjacent first refractive index layers.

In addition, in the thickness direction of the composite film module 100, for two adjacent composite layers: the refractive index of the first refractive index layer in the former composite layer is greater than the refractive index of the first refractive index layer in the latter composite layer, and the refractive index of the second refractive index layer in the former composite layer is greater than the refractive index of the second refractive index layer in the latter composite layer; or, the refractive index of the first refractive index layer in the former composite layer is greater than the refractive index of the first refractive index layer in the latter composite layer, and the refractive index of the second refractive index layer in the former composite layer is equal to the refractive index of the second refractive index layer in the latter composite layer; or, the refractive index of the first refractive index layer in the former composite layer is equal to the refractive index of the first refractive index layer in the latter composite layer, and the refractive index of the second refractive index layer in the former composite layer is greater than the refractive index of the second refractive index layer in the latter composite layer.

When the composite film module 100 is manufactured and put into use, for example, when the composite film module 100 is applied to an optical device that needs to decrease reflection, the aforementioned substrate 200 can be peeled from the composite film module 100 and then the composite film module 100 is attached to a surface of the optical device.

In an example, the aforementioned thin-film deposition includes chemical vapor deposition, physical deposition, magnetron sputtering and other processes.

In an embodiment of the present disclosure, the layers in the composite film module can be formed by silicon oxynitride, and the nitrogen content and the oxygen content therein can be controlled to make different layers have respective refractive indexes. During the manufacturing process, the layers having different refractive indexes can be continuously manufactured by using a same equipment, and there is no need to change equipment during this process, thereby effectively decreasing manufacturing costs and increasing the production efficiency.

In an embodiment, the aforementioned substrate 200 can be a glass.

Figure 11:
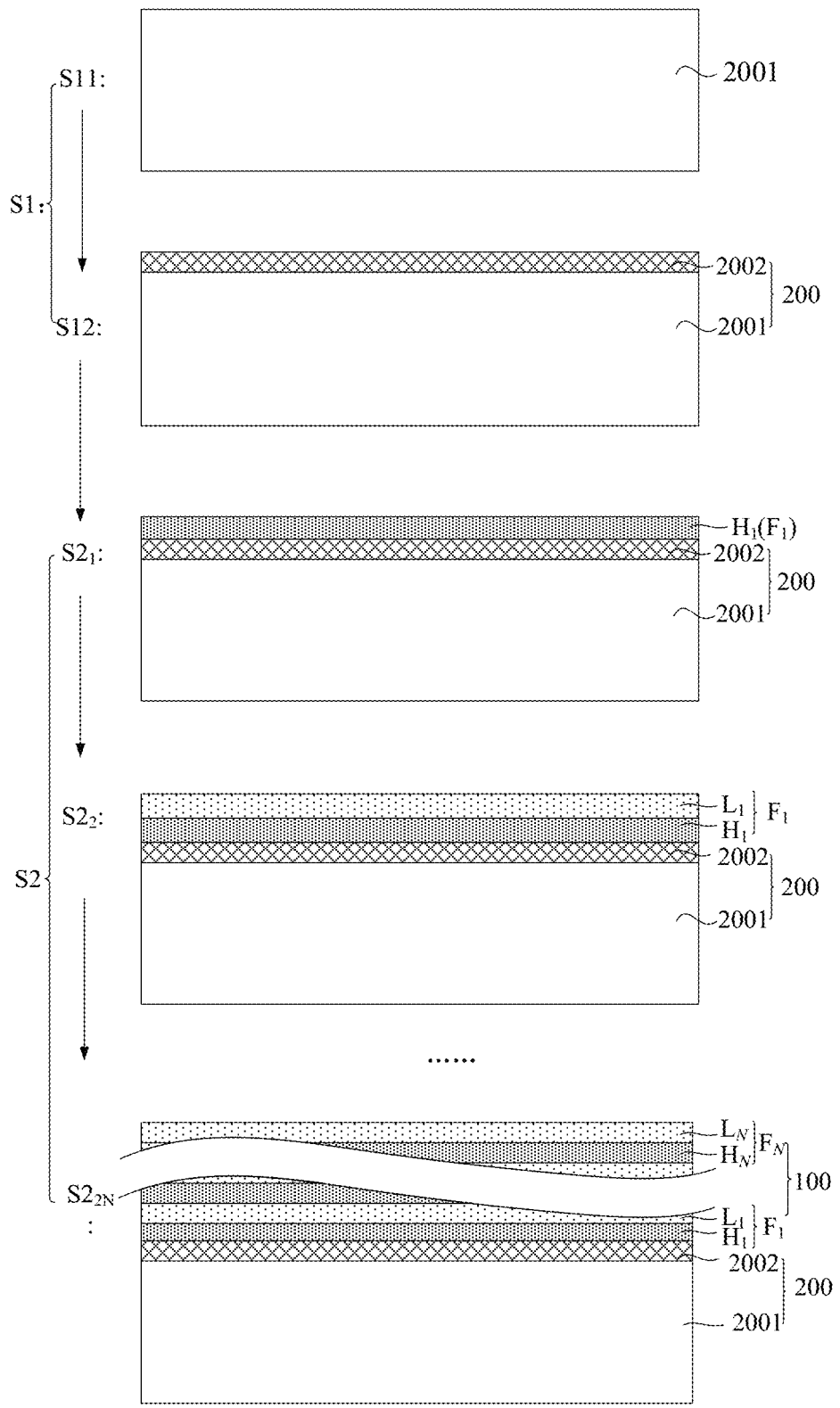
FIG. 11 is a flowchart for manufacturing another composite film module according to an embodiment of the present disclosure.

FIG. 11 is a schematic diagram of a flowchart for manufacturing another composite film module according to an embodiment of the present disclosure. In an embodiment, as shown in FIG. 11, the substrate 200 can further include a glass 2001 and a flexible base 2002, such as polyimide. The flexible base 2002 is disposed between the glass 2001 and the composite film module 100.

As shown in FIG. 11, the step S of providing the substrate 200 includes following steps.

At step S11, a glass 2001 is provided.

At step S12, a flexible base 2002 is formed one the side of the glass 2001.

After the flexible base 202 is formed, the composite film module 100 is formed on a side of the flexible base 2002 facing away from the glass 2001. The flexible base 2002 is arranged so that separation of the composite film module 100 from the glass 2001 is easily completed after manufacture is completed. After the manufacture is completed, the composite film module 100 can be separated from the glass 2001 through the flexible base 2002 by heating or laser irradiation. When the composite film module 100 is attached to the optical device later, the flexible base 2002 is disposed between the composite film module 100 and the optical device.

Figure 12:
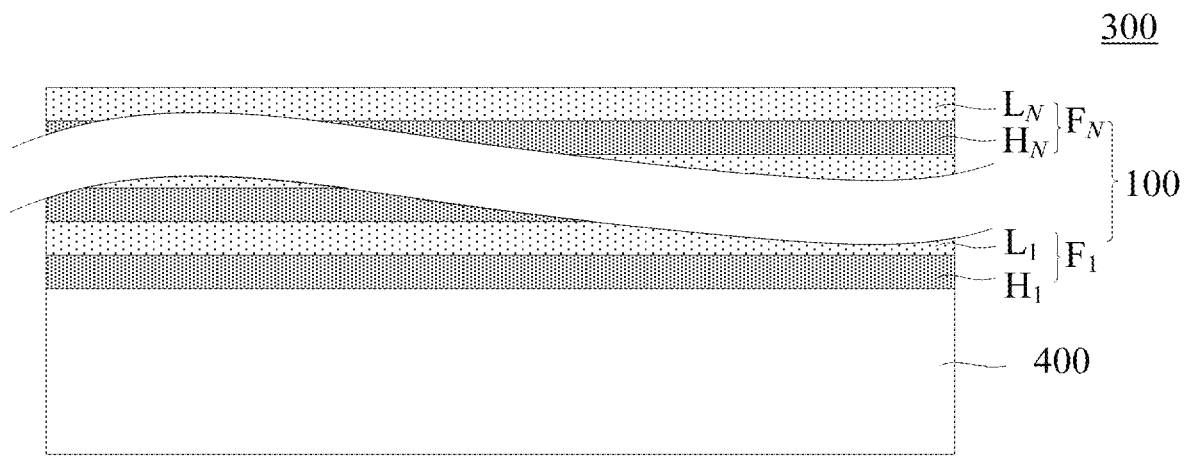
FIG. 12 is a cross-sectional view of a light collecting device according to an embodiment of the present disclosure.

An embodiment of the present disclosure further provides a light collecting device. As shown in FIG. 12, which is a cross-sectional view of a light collecting device according to an embodiment of the present disclosure, the light collecting device 300 includes a light collecting element 400 and the composite film module 100 described above. The composite film module 100 is located at a light-collecting side of the light collecting element 200. The light collecting element 400 is configured to collect light. A structure of the composite film module 100 has been described in detail in the above embodiments, and will not be repeated herein.

When the composite film module 100 is applied to the light collecting device 300, the refractive index of the first refractive index layer in the composite film module 100 closest to the light collecting element 400 is greater than or equal to each of the refractive indexes of other first refractive index layers. As shown in FIG. 12, in the composite film module 100, along a direction from the composite layer $F_1$ to the composite layer $L_N$, for two adjacent composite layers: the equivalent refractive index of the former composite layer is greater than the equivalent refractive index of the latter composite layer. For example, for any two adjacent composite layers, the equivalent refractive index of the former composite layer is greater than the equivalent refractive index of the latter composite layer. In this case, the composite layer $F_1$ is provided at a side of the composite layer $F_N$ close to the light collecting element 400.

When the light collecting element 300 is in operation, ambient light is incident from air to the light collecting element 400 through the composite film module 100, and the light passes through the composite layer having a gradually increasing refractive index during light propagation, thereby decreasing an intensity of light reflected during propagation and increasing an intensity of light incident to the light collecting element 400.

In an example, the light collecting device 300 can be a solar battery, or a lens for imaging. The application of the composite film module 100 in the solar battery can decrease reflection of sunlight at a surface of the solar battery, thereby maximizing transmittance of sunlight and improving a photoelectric conversion rate of the solar battery. The application of the composite film module 100 in the camera lens can decrease reflection of light at a surface of the lens, thereby increasing the intensity of light incident into the lens and improving an imaging effect.

Figure 13:
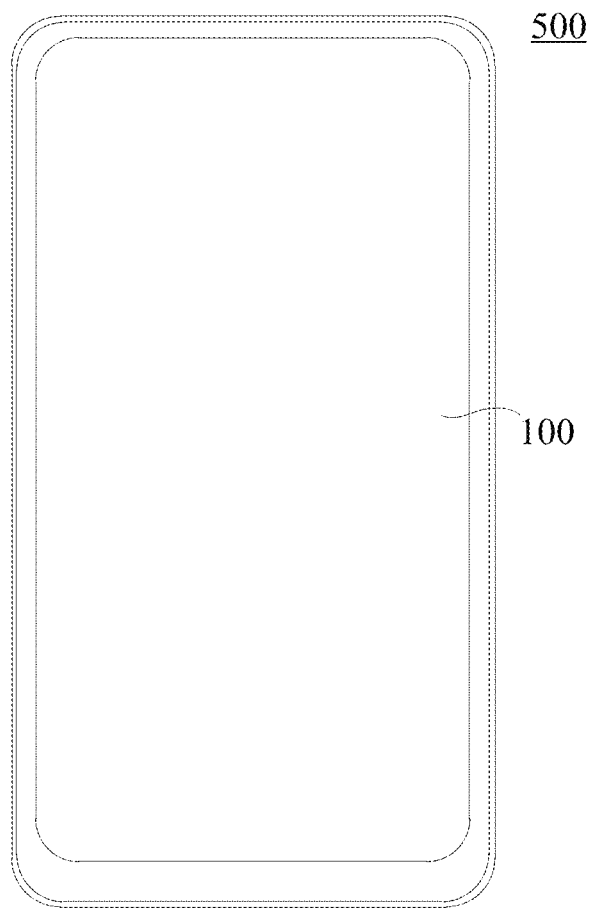
FIG. 13 is a top view of a display device according to an embodiment of the present disclosure.
Figure 14:
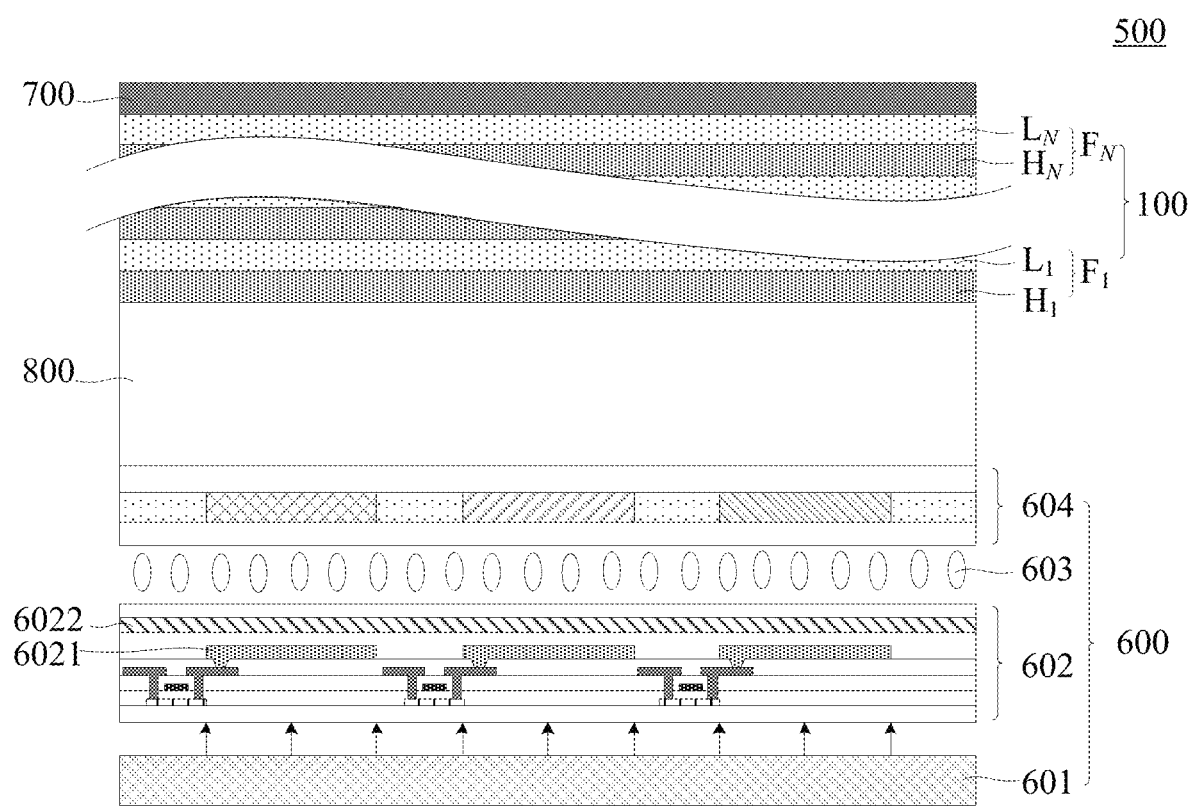
FIG. 14 is a cross-sectional view of a display device according to an embodiment of the present disclosure.
Figure 15:
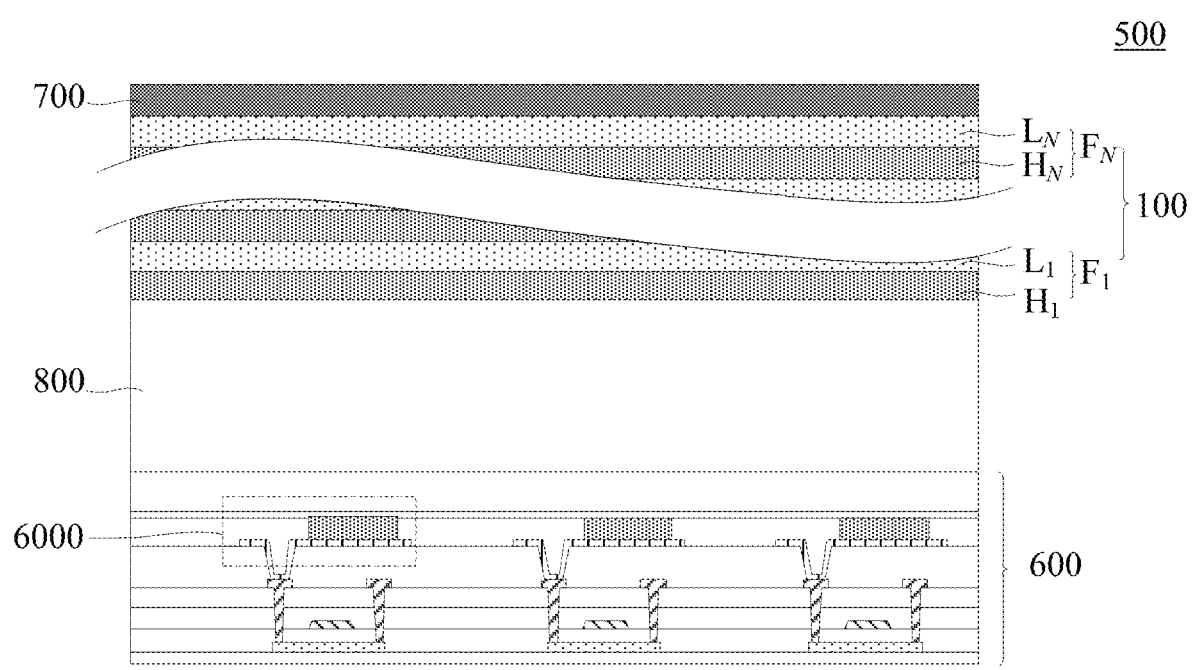
FIG. 15 is a cross-sectional view of a display device according to an embodiment of the present disclosure.

An embodiment of the present disclosure further provides a display device. FIG. 13 is a top view of a display device according to an embodiment of the present disclosure. FIG. 14 is a cross-sectional view of a display device according to an embodiment of the present disclosure. FIG. 15 is a schematic cross-sectional view of another display device according to an embodiment of the present disclosure. As shown in FIG. 13 to FIG. 15, the display device 500 includes a display panel 600 and a composite film module 100 as described above. The composite film module 100 is located at the light-exiting side of the display panel 200.

As shown in FIG. 14, the aforementioned display panel 600 can be a liquid crystal display (LCD). The display panel 600 includes an array substrate 602 and a color film substrate 604 that are opposite to each other, a liquid crystal layer 603 arranged between the array substrate 602 and the color film substrate 604, and a backlight module 601 arranged at a side of the array substrate 602 facing away from the color film substrate 604. A pixel electrode 6021 and a common electrode 6022 are provided in the array substrate 602. Under an electric field formed between the pixel electrode 6021 and the common electrode 6022, the liquid crystals are deflected, thereby modulating light emitted from the backlight element 601, and a full-color display of the display panel is achieved by a light filtering effect of the color film substrate 604.

As shown in FIG. 15, the display panel 600 can be a display panel using self-luminous technology, such as an organic light emitting diode (OLED) display panel, and a micro light emitting diode (Micro-LED) display panel or a quantum light emitting diode (QLED) display panel, etc. As shown in FIG. 15, the display panel 600 includes an organic light emitting element 6000.

A structure of the composite film module 100 has been described in detail in the foregoing embodiments, and will not be repeated herein. It should be noted that, the display devices shown in FIG. 13 to FIG. 15 are merely illustrative. The display device can be any electronic device having a display function, such as a mobile phone, a tablet computer, a notebook computer, an electronic paper book, or a television.

When the composite film module 100 is applied to the display device, the refractive index of the first refractive index layer in the composite film module 100 closest to the display panel 600 is greater than or equal to the refractive indexes of other first refractive index layers. As shown in FIG. 14 and FIG. 15, in the composite film module 100, along the direction from the composite layer $F_1$ to the composite layer $L_N$, for two adjacent composite layers: the equivalent refractive index of the former composite layer is greater than the equivalent refractive index of the latter composite layer. For example, for any two adjacent composite layers, the equivalent refractive index of the former composite layer is greater than the equivalent refractive index of the latter composite layer. In this case, the composite layer $F_1$ is disposed at a side of the composite layer FN close to the display panel 600.

When the display device 500 is in operation, ambient light is incident from air to the display panel 600 through the composite film module 100, and the light passes through the composite layer having a gradually increasing refractive index during light propagation, thereby decreasing an intensity of light reflected during propagation. In this way, the proportion of the intensity of light emitted from the display panel can be increased, thereby increasing a contrast of a display image and improving a display effect of the display device. For example, when the display device 500 is placed in an environment with strong ambient light, it can still have an excellent display effect.

In addition, when the display device 500 is provided with the composite film module 100, a hue of the display device 500 can be improved, so that the light emitted from the display device 500 has a smaller hue fluctuation.

In an embodiment of the present disclosure, the composite film module 100 can be attached to the display panel 600 in various attachment manners. For example, as shown in FIG. 14 and FIG. 15, the composite film module 100 is attached to the display panel 600 in a whole-surface attachment manner. In this case, there is no gap between the composite film module 100 and the display panel 600.

Figure 16:
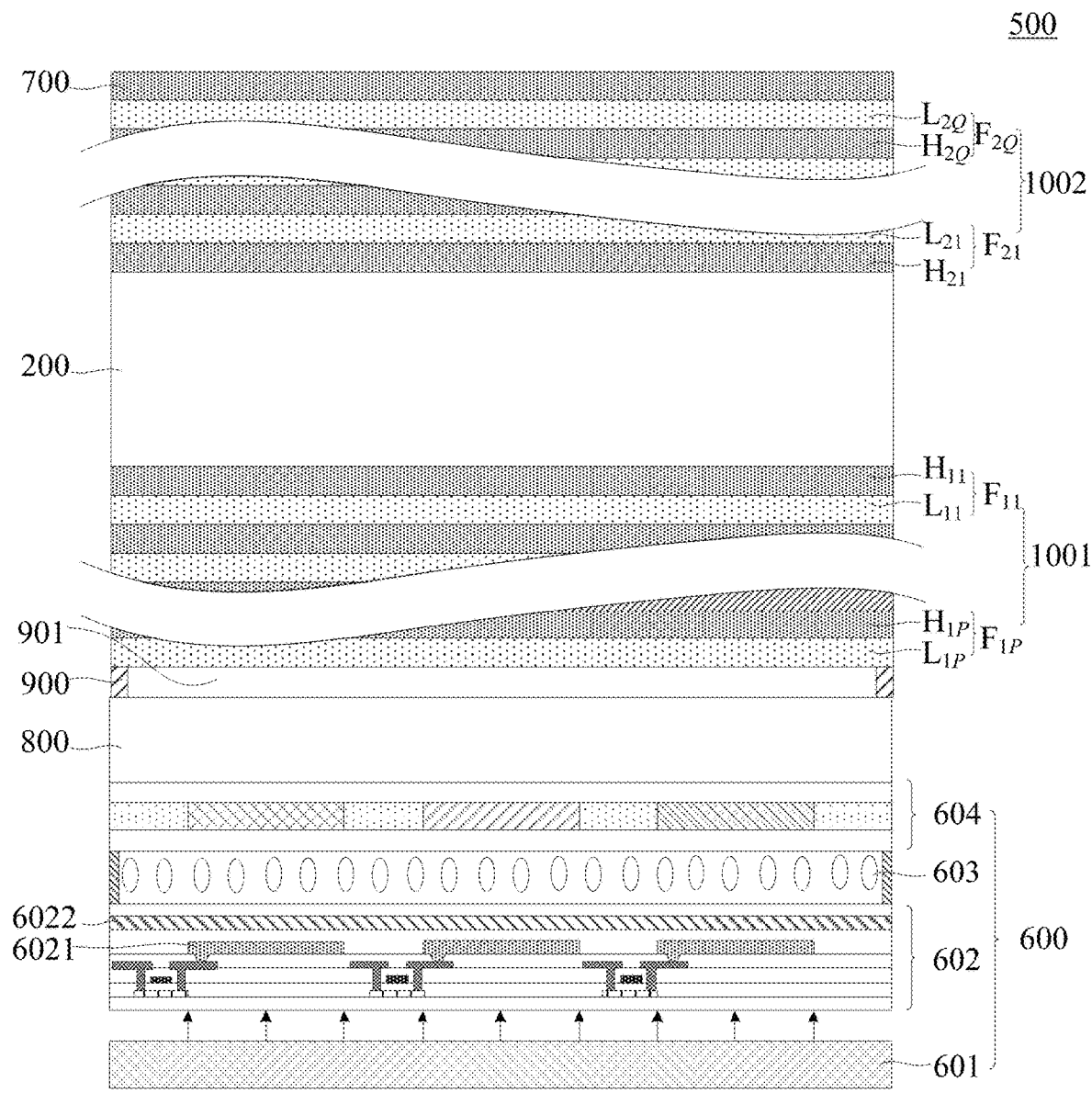
FIG. 16 is a cross-sectional view of a display device according to an embodiment of the present disclosure.
Figure 17:
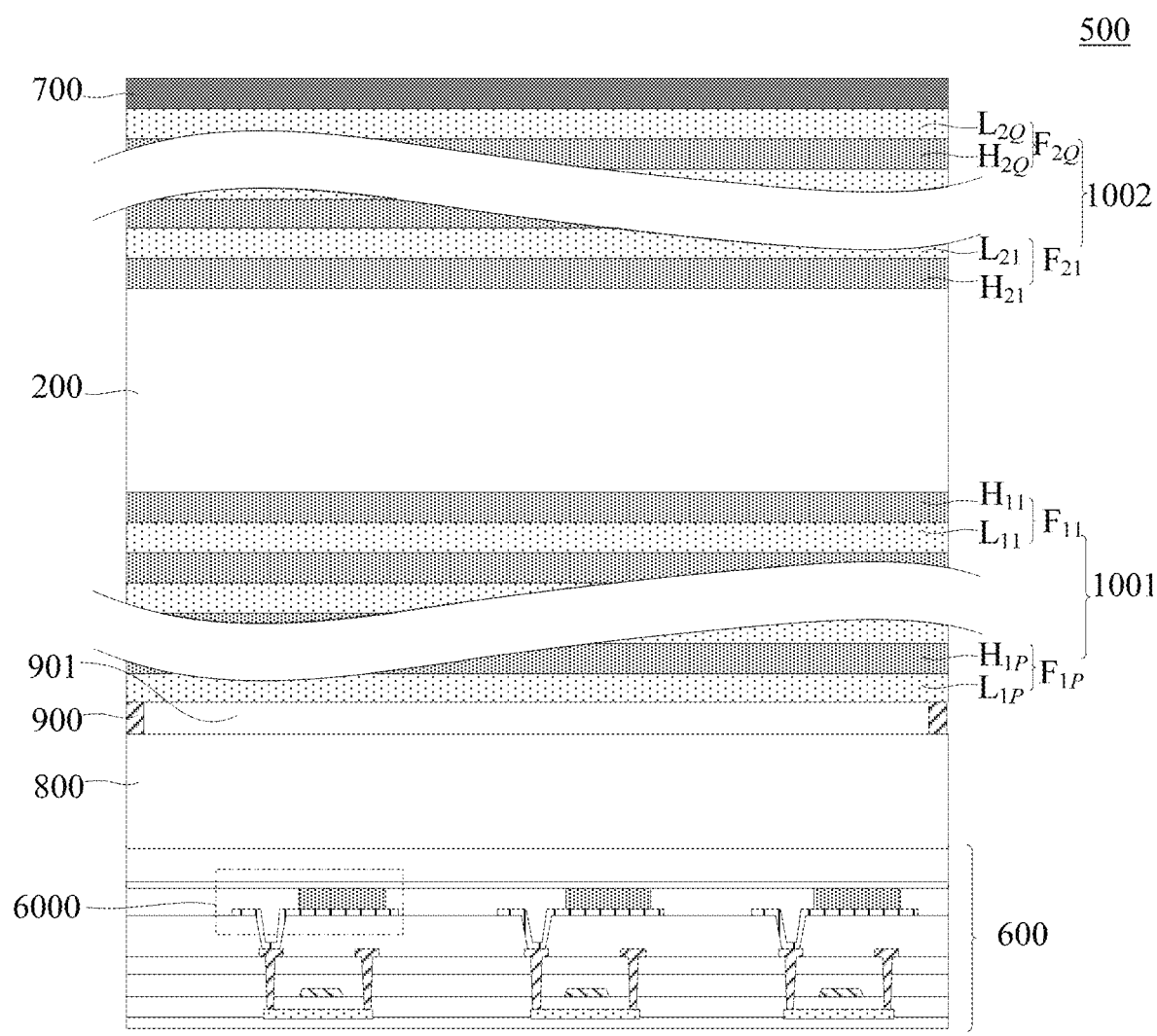
FIG. 17 is a cross-sectional view of a display device according to an embodiment of the present disclosure.

In an embodiment of the present disclosure, the composite film module 100 is attached to the display panel 600 in a frame attachment manner, that is, the composite film module 100 is attached to a frame of the display panel 600. In this case, there is a gap between the composite film module 100 and a surface of a central region of the display panel 600. In this case, two composite film modules can be provided at a light-exiting side of the display panel 600. As shown in FIG. 16 and FIG. 17, which are cross-sectional views of two display devices according to embodiments of the present disclosure. In order to distinguish the two composite film modules, for the two composite film modules as shown in FIG. 16 and FIG. 17: the composite film module close to the display panel 600 is referred to as a first composite film module 1001, and the composite film module away from the display panel 600 is referred to as a second composite film module 1002. The second composite film module 1002 is attached to the frame of the display panel 600 by an adhesive material 900, and there is air 901 between the composite film module 100 and the surface of the central region of the display panel 600.

As shown in FIG. 16 and FIG. 17, a substrate 200 is provided between the first composite film module 1001 and the second composite film module 1002. The first composite film module 1001 and the second composite film module 1002 can be formed at two opposite sides of a substrate 200. The first composite film module 1001 and the second composite film module 1002 each include a plurality of composite layers that are stacked. The first composite film module 1001 includes P composite layers that are stacked, and the second composite film module 1002 includes Q composite layers that are stacked, where P and Q are positive integers greater than or equal to 2.

In the first composite film module 1001, along the direction from the substrate 200 to the composite layer Fir, for two adjacent composite layers in the P composite layers: the equivalent refractive index of the former composite layer is greater than the equivalent refractive index of the latter composite layer. In the second composite film module 1002, along the direction from the substrate 200 to the composite layer $F_{2Q}$, for two adjacent composite layers in the Q composite layers: the equivalent refractive index of the former composite layer is greater than the equivalent refractive index of the latter composite layer. That is, along a direction from the substrate 200 to the first composite film module 1001 and along a direction from the substrate 200 to the second composite film module 1002, in the first composite film module 1001 and the second composite film module 1002, there are two adjacent composite layers with the equivalent refractive indexes having a same change trend.

With this configuration, when ambient light is incident to the display panel 600, the light sequentially passes through air, the second composite film module 1002, the substrate 200, the first composite film module 1001 and air. When the light is incident from air to the substrate 200 through the second composite film module 1002, the light passes through the composite layer having a gradually increasing refractive index, and the intensity of light which is reflected will be decreased in this process. When light is incident from the substrate 200 to air through the first composite film module 1001, the light passes through the composite layer having a gradually decreasing refractive index, and the intensity of light that is reflected will also be decreased in this process. It can be seen that when the composite film module is attached to the display panel 600 in the frame attachment manner, a matching design of the first composite film module 1001 and the second composite film module 1002 can decrease the reflective index of the ambient light and increase the intensity of light emitted from the display panel, thereby increasing a contrast of the display image. For example, when the display device 500 is placed in an environment with strong ambient light, an excellent display effect can still be achieved.

In an embodiment of the present disclosure, the number of composite layers of the first composite film module 1001 is the equal to the number of composite layers of the second composite film module 1002, and distribution of the equivalent refractive index of the composite layers in the first composite film module 1001 is the same as distribution of the equivalent refractive index of the composite layers in the second composite film module 1002. That is, the equivalent refractive index of an $i^{th}$ composite layer $F_{1i}$ in the first composite film module 1001 along a direction from the substrate 200 to the composite layer $F_{1P}$ is the same as the equivalent refractive index of an $i^{th}$ composite layer $F_{2i}$ in the second composite film module 1002 along a direction from the substrate 200 to the composite layer $F_{2Q}$. With this configuration, when manufacturing the first composite film module 1001 and the second composite film module 1002, a same film forming process can be used at two sides of the substrate 200 to form a symmetrically-distributed layer structure at two sides of a cover 800.

In an example, as shown in FIG. 14 to FIG. 17, the display device 500 further includes an antifouling layer 700, and the antifouling layer 700 is arranged on a side of the composite film module 100 facing away from the display panel 600. The antifouling layer 700 can prevent foreign objects such as fingerprints from falling onto a surface of the display device 500.

In an embodiment of the present disclosure, the antifouling layer 700 can be made of a material which is hydrophobic and oleophobic. In addition, a refractive index of the antifouling layer 300 is smaller than the refractive index of the second refractive index layer of the composite film module 100, the second refractive index layer being the second refractive index layer closest to the antifouling layer in the composite film module 100. Taking an orientation shown in FIG. 14 and FIG. 15 as an example, the refractive index of the antifouling layer 700 is smaller than the refractive index of the second refractive index layer $L_N$ in the composite layer $F_N$. Taking an orientation shown in FIG. 16 and FIG. 17 as an example, the refractive index of the antifouling layer 700 is smaller than the refractive index of the second refractive index layer $L_{2Q}$ in the composite layer $F_{2Q}$. With such configuration, the reflective index when light is incident from air to the composite film module through the antifouling layer 700 can be decreased.

Figure 18:
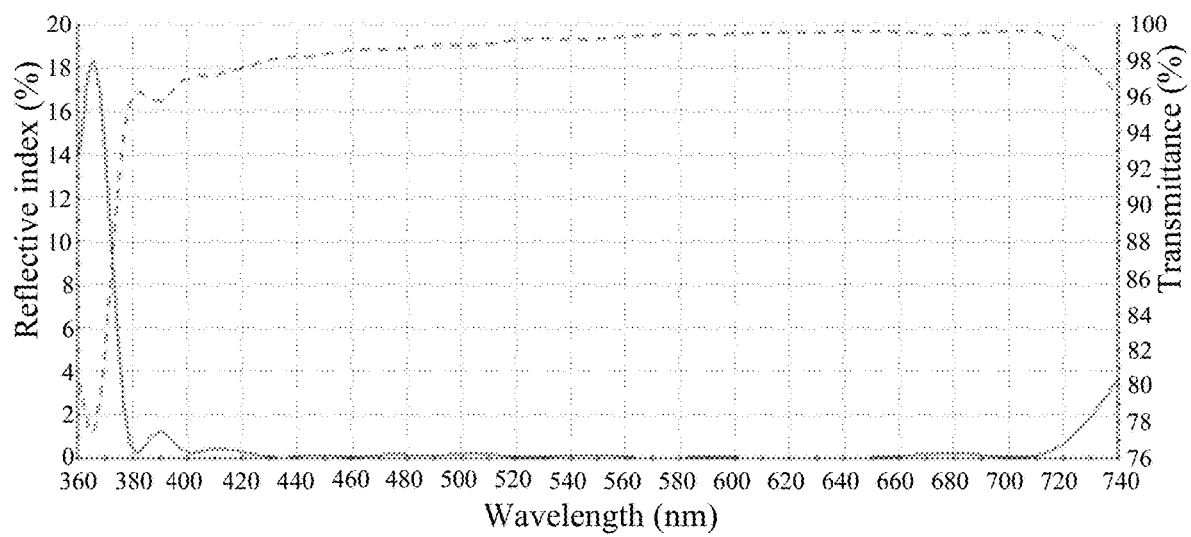
FIG. 18 is a schematic diagram of a simulation result of transmittance and reflective index of a composite film module according to an embodiment of the present disclosure.

FIG. 18 is a schematic diagram of a simulation result of transmittance and reflective index of a composite film module according to an embodiment of the present disclosure. As shown in FIG. 18, a solid line represents the reflective index, and a dotted line represents the transmittance. The composite film module includes seven composite layers and an antifouling layer disposed on a side of the composite layer $F_7$ facing away from the composite layer $F_6$. The first refractive index layers of the seven composite layers have a same refractive index, and the refractive index of the second refractive index layer in the first composite layer $F_1$ is greater than the refractive index of the second refractive index layer in the second composite layer $F_2$, the refractive index of the second refractive index layer in the second composite layer $F_2$ is greater than the refractive index of the second refractive index layer in the third composite layer $F_3$, the refractive index of the second refractive index layer in the third composite layer $F_3$ is greater than the refractive index of the second refractive index layer in the fourth composite layer $F_4$, the refractive index of the second refractive index layer of the fourth composite layer $F_4$ is greater than the refractive index of the second refractive index layer in the fifth composite layer $F_5$, the refractive index of the second refractive index layer in the fifth composite layer $F_5$ is greater than the refractive index of the second refractive index layer in the sixth composite layer $F_6$, the refractive index of the second refractive index layer in the sixth composite layer $F_6$ is greater than the refractive index of the second refractive index layer in the seventh composite layer $F_7$, and the refractive index of the second refractive index layer in the seventh composite layer $F_7$ is greater than the refractive index of the antifouling layer. Experiments have shown that the reflective index of the composite film module in this embodiment is smaller than or equal to 0.1416% in a visible light band (wavelength ranging from 400 nm to 800 nm), which is much smaller than a value in a range of 0.28% to 0.37% in the related art. In addition, the transmittance of the composite film module in this embodiment can be greater than or equal to 97% in the visible light band.

Figure 19:
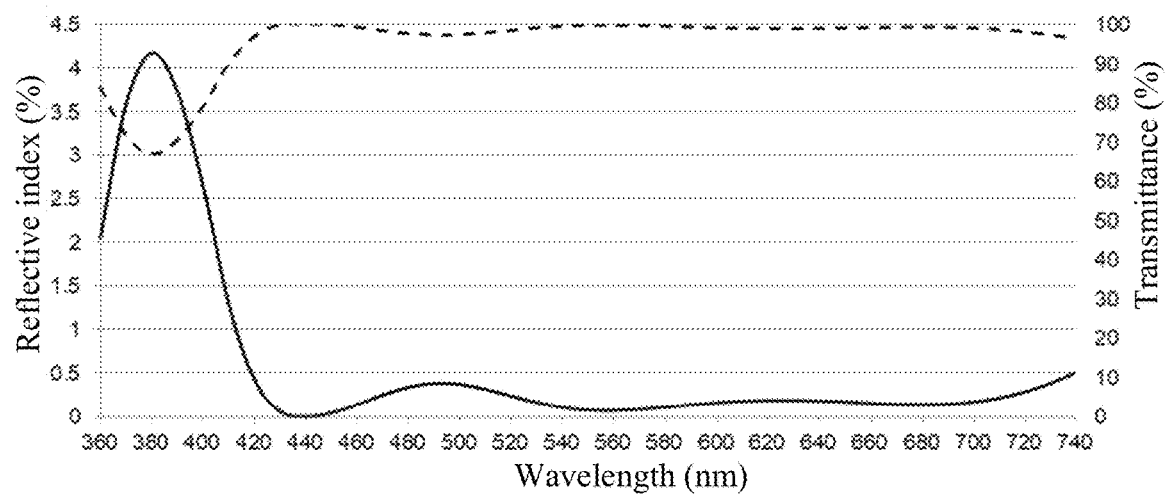
FIG. 19 is a schematic diagram of a simulation result of transmittance and reflective index of a composite film module according to an embodiment of the present disclosure.

FIG. 19 is a schematic diagram of a simulation result of transmittance and reflective index of another composite film module according to an embodiment of the present disclosure. As shown in FIG. 19, a solid line represents the reflective index, and a dotted line represents the transmittance. The composite film module includes three composite layers. The first refractive index layers and the second refractive index layers in the three composite layers are configured according to FIG. 5, that is, the refractive index of the first refractive index layer in the first composite layer $F_1$ is equal to the refractive index of the first refractive index layer in the second composite layer $F_2$; the refractive index of the second refractive index layer in the first composite layer $F_1$ is the same as the refractive index of the first refractive index layer in the third composite layer $F_3$; and the refractive index of the second refractive index layer in the second composite layer $F_2$ is the same as the refractive index of the second refractive index layer in the third composite layer $F_3$. Experiments have proved that the reflective index of the composite film module is smaller than or equal to 0.3% in a visible light band (wavelength ranging from 400 nm to 800 nm), and the transmittance of the composite film module in this embodiment is greater than or equal to 97% in the visible light band.

Figure 20:
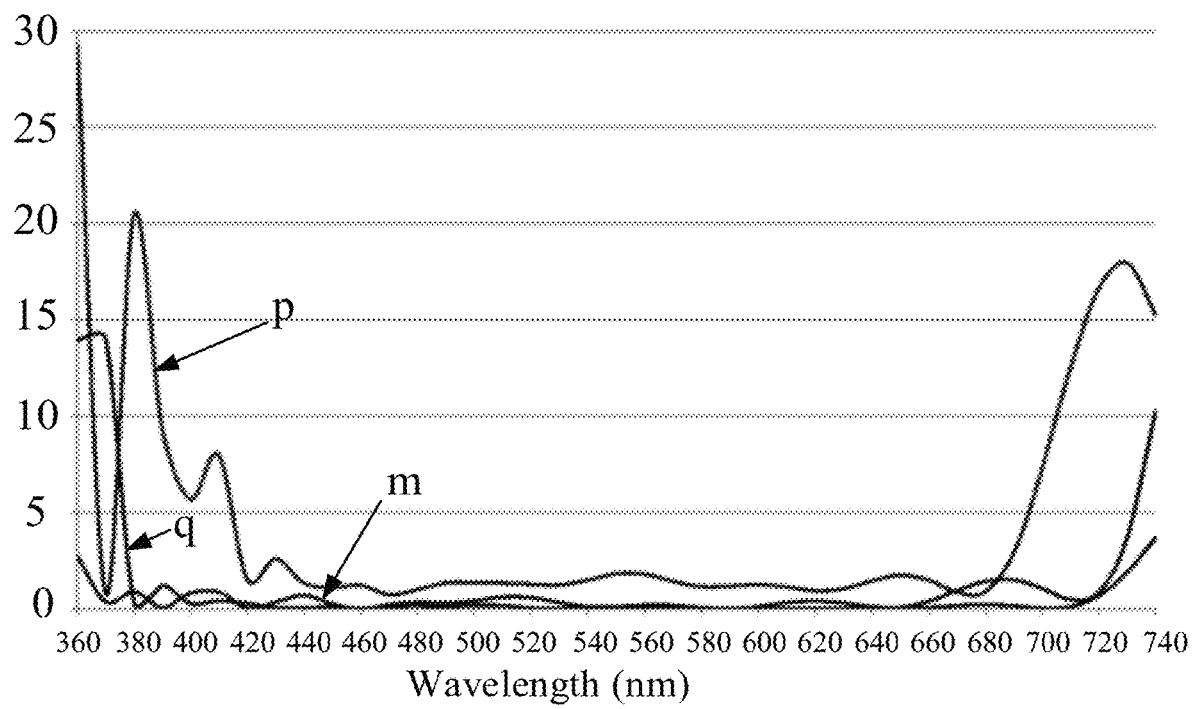
FIG. 20 is a schematic diagram of simulation results of reflective indexes of three different composite film modules having a same number of layers according to an embodiment of the present disclosure.
Figure 21:
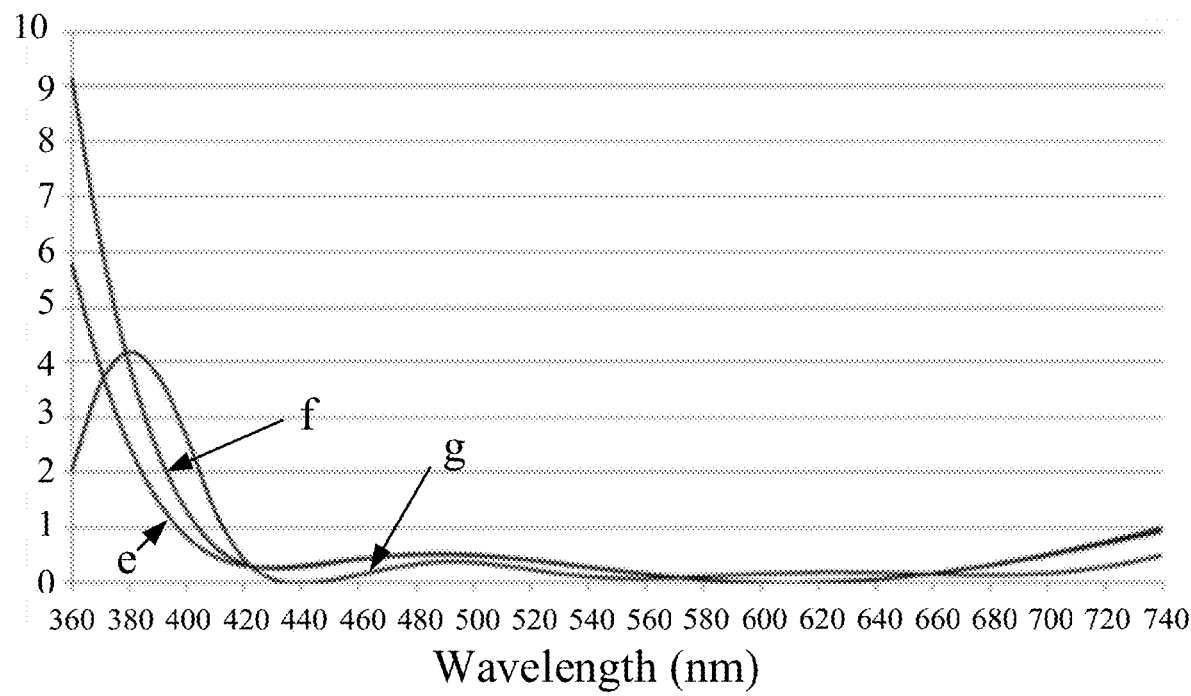
FIG. 21 is a schematic diagram of simulation results of reflective indexes of three different composite film modules having a same number of layers according to an embodiment of the present disclosure.

In addition, an embodiment of the present disclosure simulates the reflective indexes of three composite film modules having a same number of layers but different architectures. The comparison diagrams are shown in FIG. 20 and FIG. 21. FIG. 20 and FIG. 21 are schematic diagram of simulation results of the reflective indexes of three different composite film modules having a same number of layers. In FIG. 20, a curve p represents a reflective index of a composite film module including alternately arranged $Nb_2O_5$ and $SiO_2$ in the related art, and a curve q represents a reflective index of a composite film module according to an embodiment of the present disclosure, where the refractive index distribution between two adjacent composite layers is configured according to FIG. 4, and a curve m represents a reflective index of the composite film module including alternately arranged silicon nitride and $SiO_2$ in the related art. In addition, the three composite film modules tested by curve p, curve q and curve m include a same number of layers. In FIG. 21, a curve e represents a reflective index of a composite film module including alternately arranged silicon nitride and $SiO_2$ in the related art, a curve f represents a reflective index of a composite film module including alternately arranged $Nb_2O_5$ and $SiO_2$ in the related art, and a curve g represents a reflective index of another composite film module according to an embodiment of the present disclosure, where the refractive index distribution between three adjacent composite layers is configured according to FIG. 5, and the three composite film modules tested by the curve e, the curve f, and the curve g include a same number of layers. The composite film modules in FIG. 20 and FIG. 21 have different numbers of layers.

It can be seen that when the composite film modules have a same number of layers, in the visible light band, the reflective index of the composite film modules according to an embodiment of the present disclosure represented by the curve q and the curve g are smaller.

Figure 22:
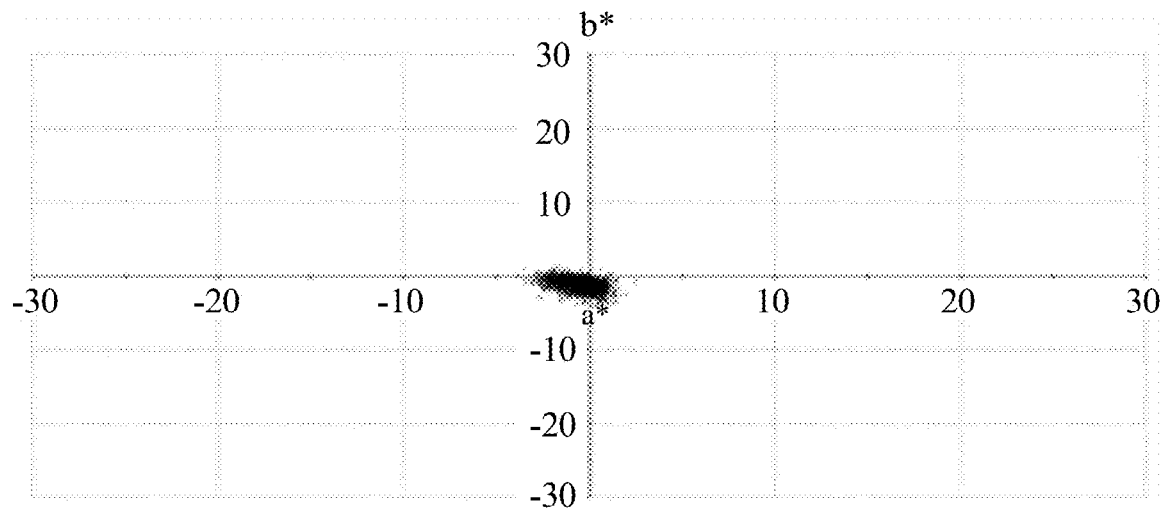
FIG. 22 is a schematic diagram of a hue simulation result of a display device according to an embodiment of the present disclosure.

FIG. 22 is a schematic diagram of a hue simulation result of a display device according to an embodiment of the present disclosure. As shown in FIG. 22, the display device includes a composite film module and an antifouling layer. A structure of the composite film module is the same as the structure tested in FIG. 18. Experiments have proved that the display device according to this embodiment of the present disclosure has a smaller hue fluctuation. Here, a* has a minimum value of −4 and a maximum value of 1, and b* has a minimum value of −3.5 and a maximum value of 2.5.

Figure 23:
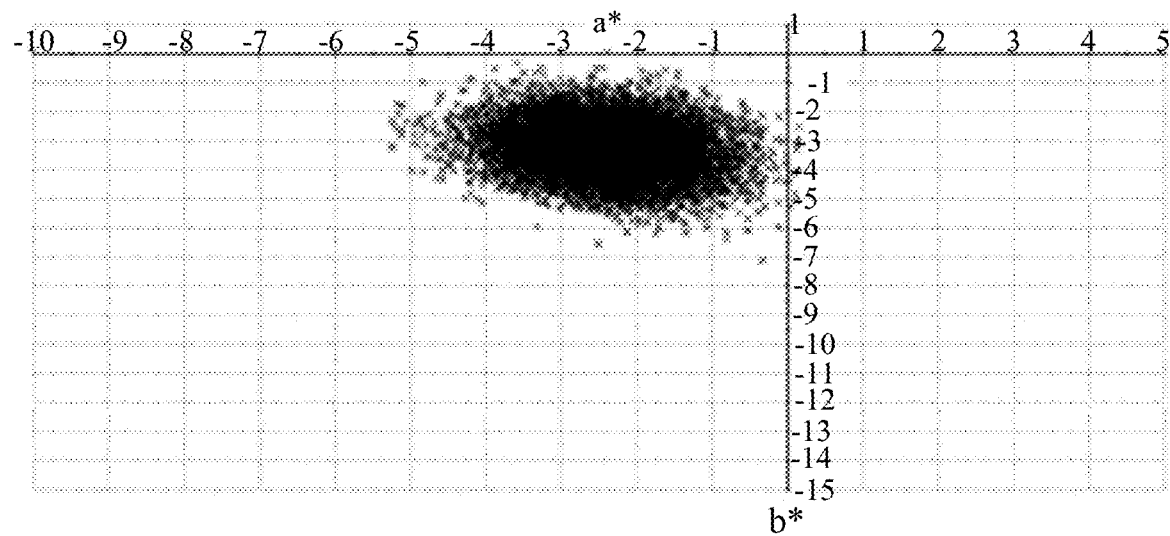
FIG. 23 is a schematic diagram of a hue simulation result of a display device according to an embodiment of the present disclosure.

FIG. 23 is a schematic diagram of a hue simulation result of another display device according to an embodiment of the present disclosure. The display device includes a composite film module and an antifouling layer. A structure of the composite film module is the same as the structure tested in FIG. 19. Experiments have proved that the display device according to an embodiment of the present disclosure has a smaller hue fluctuation. Here, a* has a minimum value of −5.2 and a maximum value of 0.2, and b* has a minimum value of −7 and a maximum value of 0.2.

Figure 24:
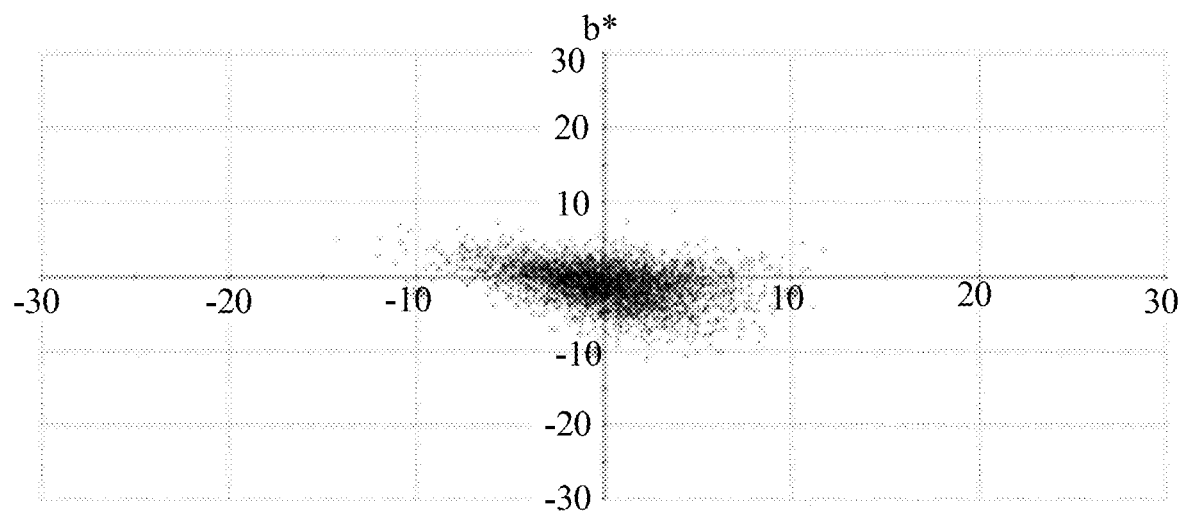
FIG. 24 is a schematic diagram of a hue simulation result of a display device in the related art.
Figure 25:
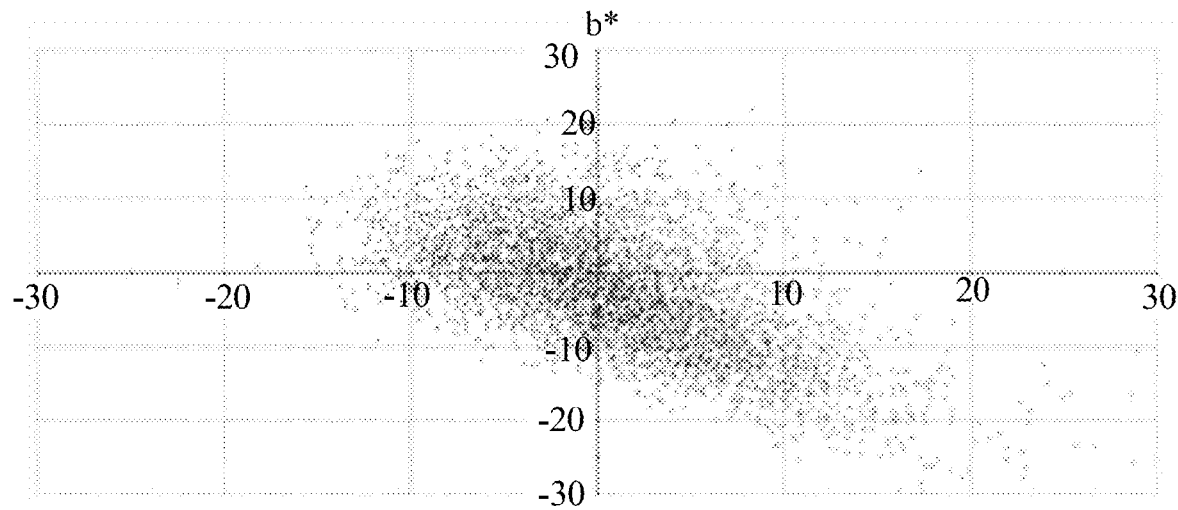
FIG. 25 is a schematic diagram of a hue simulation result of another display device in the related art.

FIG. 24 and FIG. 25 are schematic diagrams of hue simulation results of two display devices in the related art. Comparing FIG. 24 and FIG. 25, the light-exiting side of each of the two display devices is provided with a composite film module and an antifouling layer. Here, the composite film module includes seven composite layers. In the seven composite layers tested in FIG. 24, each of the first refractive index layers is formed by silicon nitride and has a refractive index of 1.84, and each of the second refractive index layers is formed by $SiO_2$ and has a refractive index of 1.46. The refractive index of the antifouling layer is 1.31. That is, each of the first refractive index layers is a large-refractive index layer, and each of the second refractive index layer is a small-refractive index layer. In the seven composite layers tested in FIG. 24, the first refractive index layer and the second refractive index layer are alternately and repeatedly arranged. In the seven composite layers tested in FIG. 25, each of the first refractive index layers is formed by $Nb_2O_5$ and has a refractive index of 2.32, and each of the second refractive index layers is formed by $SiO_2$ and a refractive index of 1.46. The refractive index of the antifouling layer is 1.31. That is, each of the first refractive index layers is a large-refractive index layer, and each of the second refractive index layers is a small-refractive index layer. In the seven composite layers tested in FIG. 25, the first refractive index layer and the second refractive index layer are alternately and repeatedly arranged. It can be seen that each of the display devices tested in FIG. 24 and FIG. 25 has a large hue fluctuation. In the display device tested in FIG. 24, a* has a minimum value of −15 and a maximum value of 12, and b* has a minimum value of −11 and a maximum value of 9. In the display device tested in FIG. 25, a* has a minimum value of −20 and a maximum value of 30, and b* has a minimum value of −30 and a maximum value of 25, and a hue fluctuation thereof is the largest.

Figure 26:
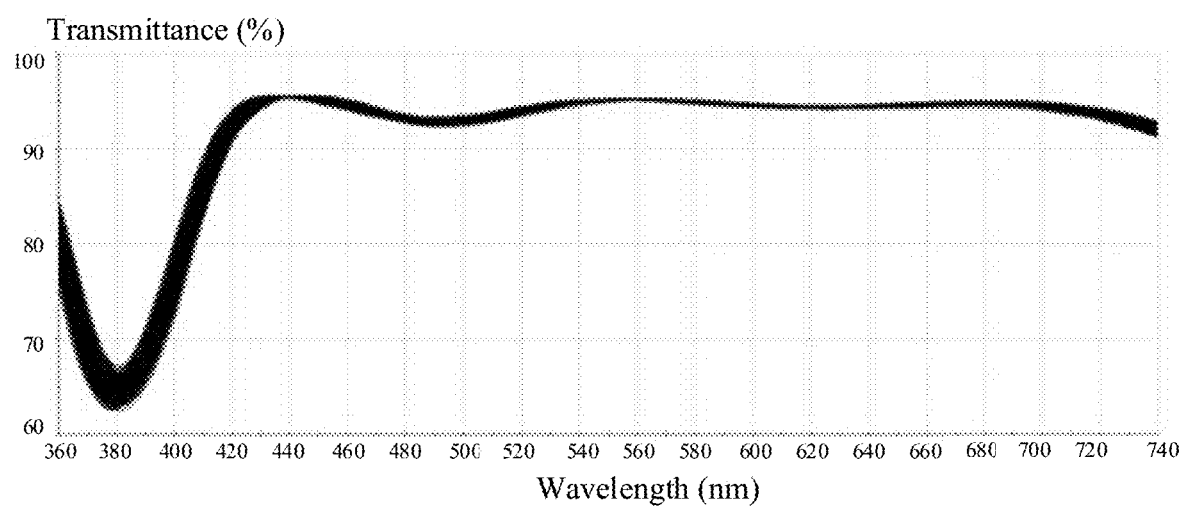
FIG. 26 is a schematic diagram of a simulation result of transmittance fluctuation of a composite film module according to an embodiment of the present disclosure.

FIG. 26 is a schematic diagram of a simulation result of transmittance fluctuation of a composite film module according to an embodiment of the present disclosure. As shown in FIG. 26, a structure of the composite film module is the same as the structure tested in FIG. 19. Experiments have proved that the transmittance of the composite film module according to this embodiment fluctuates around 95.1% in a visible light band (wavelength ranging from 400 nm to 800 nm), and the smallest transmittance is 94.6%.

Figure 27:
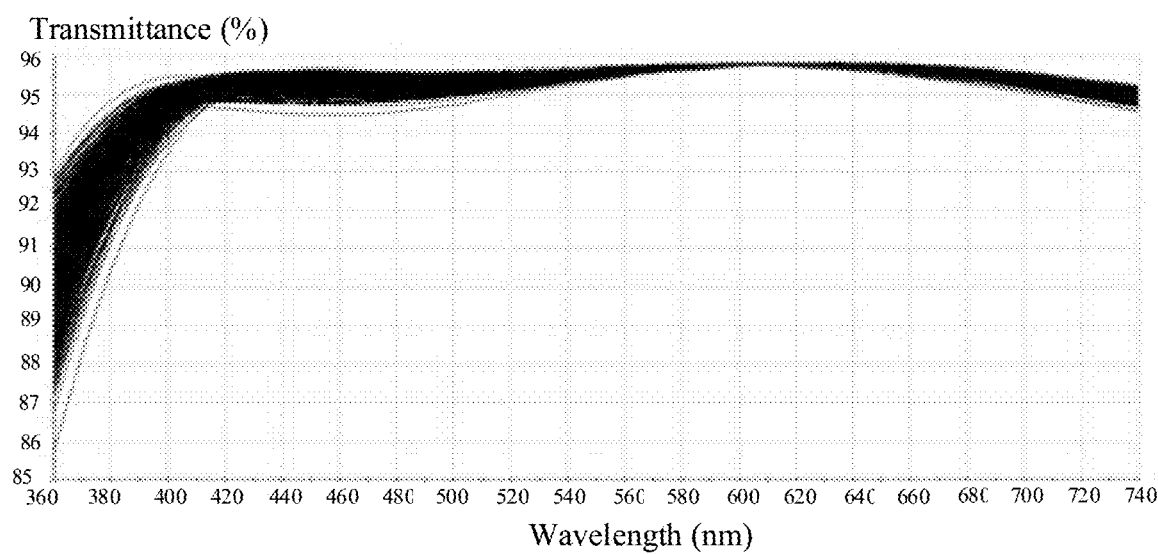
FIG. 27 is a schematic diagram of a simulation result of fluctuation in transmittance of a composite film module in the related art.
Figure 28:
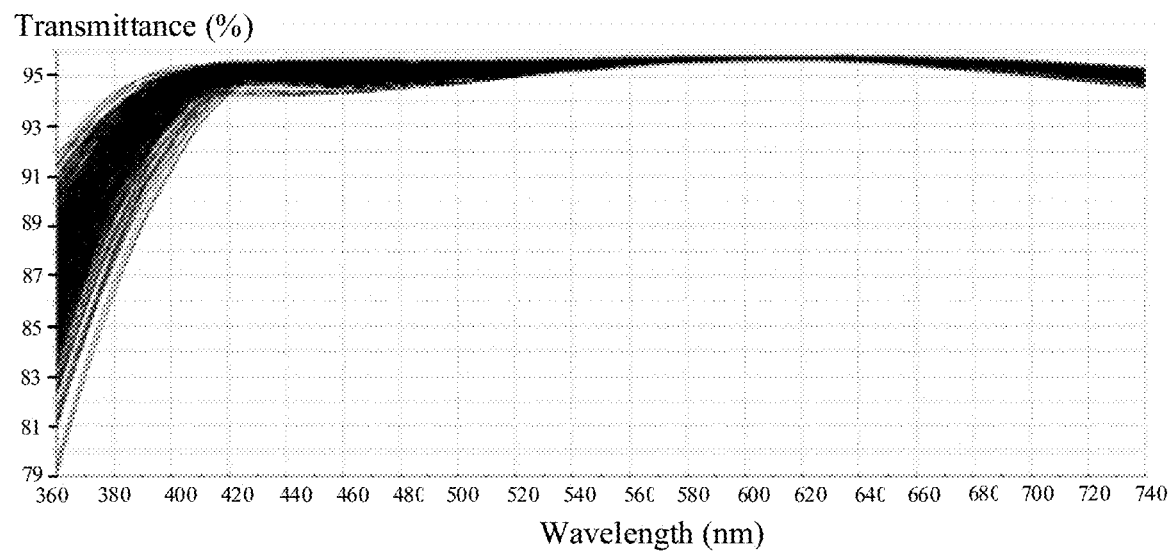
FIG. 28 is a schematic diagram of a simulation result of fluctuation in transmittance of another composite film module in the related art.

FIG. 27 and FIG. 28 are schematic diagrams of simulation results of a same number of fluctuations in transmittances of the two composite film modules in the related art. Comparing FIG. 27 and FIG. 28, it can be seen that the structures of the composite film modules tested in FIG. 27 and FIG. 28 are the same as the structures of those tested in FIG. 24 and FIG. 25, respectively. By comparison, it can be seen that the transmittance of the composite film module according to this embodiment fluctuates in a narrow range in a visible light band (wavelength ranging from 400 nm to 800 nm).

It can be seen from the comparison that, for a large-refractive index layer and a small-refractive index layer that are repeatedly and alternately arranged at the light-exiting side of the display panel in the related art, it requires a cavity with different materials and needs to switch between different film forming machines, which may lead to complicated processes and higher costs, moreover, the reflective index is excessively high and the refractive index of each layer is constant, and thus a hue of the display device cannot be adjusted when it is applied to the display device. When the composite film module 100 provided by an embodiment of the present disclosure is applied to the display device 500, each of the first refractive index layer and the second refractive index layer has a whole-layer structure and thus can be formed by a single process, thereby decreasing difficulty for manufacturing the display device 500 and decreasing the manufacturing costs. In addition, the display device using the composite film module 100 has a high contrast and a low hue fluctuation, thereby being beneficial to designing a hue value satisfying customer requirements.

In an example, as shown in FIG. 14 to FIG. 17, the display device 500 further includes a cover 800. As shown in FIG. 14 and FIG. 15, the cover 800 is disposed between the composite film module 100 and the display panel 600. As shown in FIG. 16 and FIG. 17, the cover 800 is disposed between the first composite film module 1001 and the display panel 600. The cover 800 is used to protect the display panel 600. In an example, the cover 800 can be a glass.

In an example, when manufacturing the display devices shown in FIG. 14 to FIG. 17, the display panel 600 and the composite film module can be manufactured separately. After the display panel 600 and the composite film module are both manufactured, the display panel 600 is attached to the composite film module to form the display device described above. In this embodiment of the present disclosure, the display panel 600 and the composite film module are manufactured separately, so that manufacturing of different layers in the display panel 600 and the composite film module can be prevented from affecting each other. Here, a manufacturing process of the cover 800 can be integrated into a manufacturing process of the display panel 600. For example, the manufacturing process of the cover 800 can be performed after the encapsulation layer of the display panel 600 is manufactured.

When the composite film module is attached to the display panel in a whole-surface attachment manner, the manufacturing process of the composite film module can be performed according to the method shown in FIG. 10. After the composite film module is manufactured, the composite film module 100 can be separated from the substrate 200; then, the composite film module 100 can be attached to the light-exiting side of the display panel 600. The composite film module 100 is attached to the cover 800 disposed at the light-exiting side of the display panel 600. In an embodiment, after the composite film module is manufactured, as shown in FIG. 10, the composite film module 100 is not be separated from the substrate 200. In this way, in the manufacturing process of the display panel, the manufacturing process of cover 800 can be omitted. When the composite film module 100 is attached to the light-exiting side of the display panel 600, the substrate 200 forming the composite film module 100 can be reused as a cover 800 disposed at the light-exiting side of the display panel 600 to protect the display panel 600, thereby decreasing manufacturing costs.

When the composite film module is attached to the display panel in the frame attachment manner, in the manufacturing process of the composite film module, the method shown in FIG. 10 can be used to form the first composite film module 1001 and the second composite film module 1002 at two sides of the substrate 200. After the first composite film module 1001 and the second composite film module 1002 are manufactured, the first composite film module 1001 is attached to the light-exiting side of the display panel 600. For example, the first composite film module 1001 is attached to an edge of the cover 800 disposed at the light-exiting side of the display panel 600 by an adhesive material 900. In this process, there is no need to separate the first composite film module 1001 and the second composite film module 1002 from the substrate 200.

Figure 29:
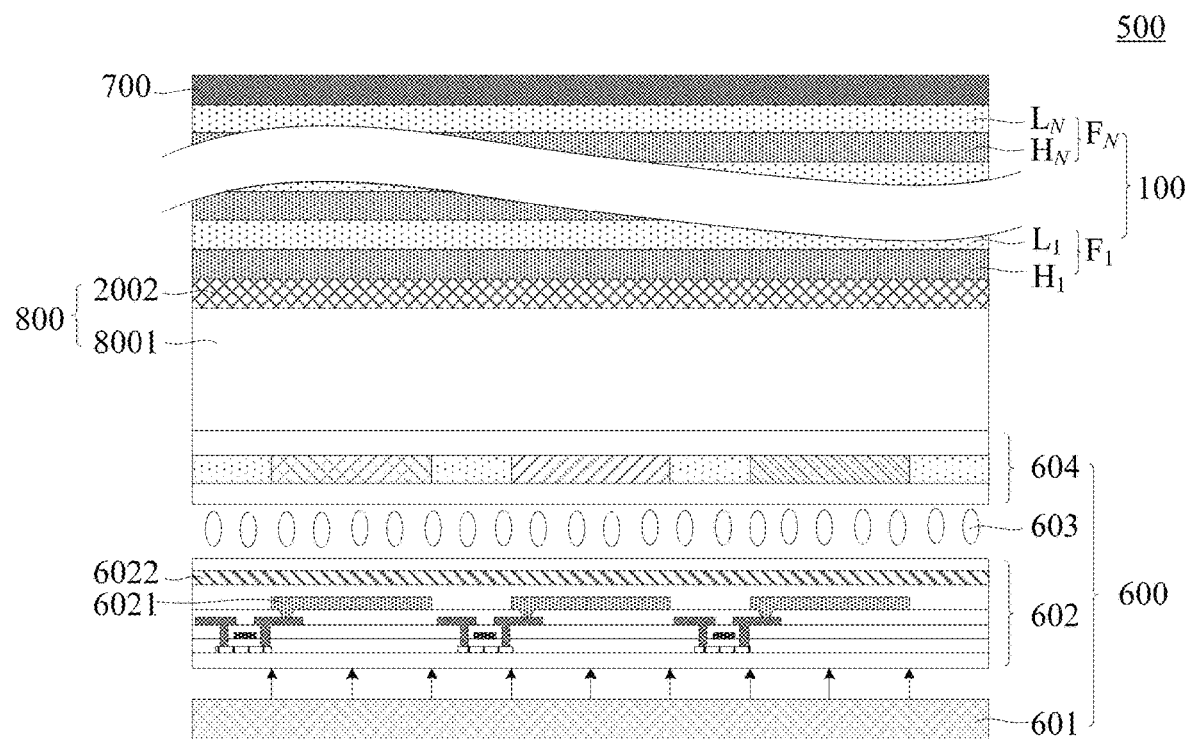
FIG. 29 is a cross-sectional view of a display device according to embodiments of the present disclosure.
Figure 30:
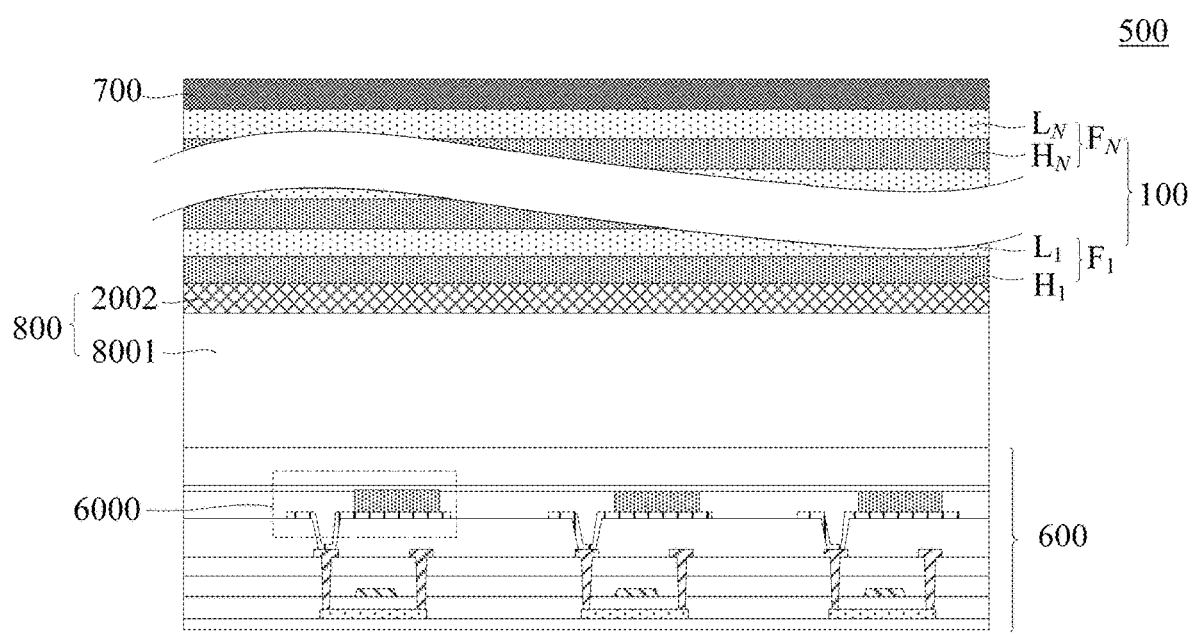
FIG. 30 is a cross-sectional view of a display device according to embodiments of the present disclosure.

FIG. 29 and FIG. 30 are schematic cross-sectional views of two other display devices according to embodiments of the present disclosure. In an embodiment, as shown in FIG. 29 and FIG. 30, the cover 800 includes a glass 8001 and a flexible base 2002 (such as polyimide) that are stacked. The flexible base 2002 is disposed between the glass 8001 and the composite film module 100.

In an example, when manufacturing the display device shown in FIG. 29 and FIG. 30, the display panel 600 and the composite film module 100 can be manufactured separately. Here, the manufacturing process of the composite film module 100 can be performed according to the method shown in FIG. 11. A glass 8001 as shown in FIG. 29 and FIG. 30 can be provided at a light-exiting side of the display panel 600. Here, the manufacturing process of the glass 8001 can be integrated into the manufacturing process of the display panel 600. For example, the manufacturing process of the cover 800 can be performed after the encapsulation preparation of the display panel 600 is manufactured. After the composite film module 100 is manufactured, as shown in FIG. 11, the composite film module 100 can be separated from the glass 2001 through the flexible base 2002 by heating or laser irradiation. When the composite film module 100 is attached to the display panel 600 later, a side of the composite film module 100 in contact with the flexible base 2002 is arranged close to the display panel 600, that is, the flexible base 2002 is arranged between the composite film module 100 and the glass 8001. As shown in FIG. 11, the flexible base 2002 is arranged to facilitate separation of the composite film module 100 from the glass 2001 (which serves as a carrier substrate during the manufacturing process) after the composite film module 100 is manufactured.

The above description is merely exemplary embodiments of the present disclosure, and is not intended to limit the scope of the present disclosure. All equivalent modification or equivalent replacement and improvement made within the principle of the present disclosure fall within the present disclosure.

What is claimed is:

1. A composite film module, comprising at least two composite layers, wherein each of the at least two composite layers comprises a first refractive index layer and a second refractive index layer that are stacked, and the first refractive index layer has a refractive index greater than a refractive index of the second refractive index layer;

wherein one of the first refractive index layers of the at least two composite layers is disposed between every two adjacent second refractive index layers of the second refractive index layers of the at least two composite layers, and one of the second refractive index layers is disposed between every two adjacent first refractive index layers of the first refractive index layers;

wherein along a thickness direction of the composite film module, a first composite layer and a second composite layer of the at least two composite layers are adjacent to each other;

wherein the refractive index of the first refractive index layer of the first composite layer is equal to the refractive index of the first refractive index layer of the second composite layer, and the refractive index of the second refractive index layer of the first composite layer is greater than the refractive index of the second refractive index layer of the second composite layer; and wherein the second refractive index layer of the first composite layer and the second refractive index layer of the second composite layer are each made of silicon oxynitride, and a nitrogen content in the second refractive index layer of the first composite layer is greater than a nitrogen content in the second refractive index layer of the second composite layer.

2. The composite film module according to claim 1, wherein the refractive index of the second refractive index layer of the first composite layer is smaller than the refractive index of the first refractive index layer of the second composite layer.

3. The composite film module according to claim 1, wherein along the thickness direction of the composite film module, every two adjacent composite layers of the at least two composite layers are the first composite layer and the second composite layer, and wherein the refractive index of the first refractive index layer of the first composite layer of the every two adjacent composite layers is greater than the refractive index of the first refractive index layer of the second composite layer of the every two adjacent composite layers, and the refractive index of the second refractive index layer of the first composite layer is greater than the refractive index of the second refractive index layer of the second composite layer; or the refractive index of the first refractive index layer of the first composite layer of the every two adjacent composite layers is greater than the refractive index of the first refractive index layer of the second composite layer of the every two adjacent composite layers, and the refractive index of the second refractive index layer of the first composite layer is equal to the refractive index of the second refractive index layer of the second composite layer; or the refractive index of the first refractive index layer of the first composite layer of the every two adjacent composite layers is equal to the refractive index of the first refractive index layer of the second composite layer of the every two adjacent composite layers, and the refractive index of the second refractive index layer of the first composite layer is greater than the refractive index of the second refractive index layer of the second composite layer.

4. The composite film module according to claim 1, wherein the at least two composite layers comprises at most ten composite layers.

5. The composite film module according to claim 1, wherein the first refractive index layer is made of at least one of metal, metal nitride, metal oxide, metal oxynitride, silicon nitride, silicon oxide, or silicon oxynitride; and wherein the second refractive index layer is made of at least one of metal fluoride, silicon oxide, or silicon nitride.

6. The composite film module according to claim 5, wherein the first refractive index layer of the first composite layer and the first refractive index layer of the second composite layer comprise a same material.

7. The composite film module according to claim 1, wherein the refractive index $n_H$ of the first refractive index layer of each of the at least two composite layers satisfies: $1.8 \leq n_H \leq 4$.

8. The composite film module according to claim 1, wherein the refractive index $n_L$ of the second refractive index layer of each of the at least two composite layers satisfies: $1.35 \leq n_L \leq 2$.

9. The composite film module according to claim 1, wherein the first refractive index layer of each of the at least two composite layers has a thickness $T_H$, where $1 \text{ nm} \leq T_H \leq 1000 \text{ nm}$.

10. The composite film module according to claim 1, wherein the refractive index $T_L$ of the second refractive index layer of each of the at least two composite layers satisfies: $1 \text{ nm} \leq T_L \leq 1000 \text{ nm}$.

11. The composite film module according to claim 2, wherein the at least two composite layers comprise at least three composite layers, along the thickness direction of the composite film module, three adjacent composite layers of the at least three composite layers are the first composite layer, the second composite layer, and a third composite layer;
wherein the refractive index of the first refractive index layer of the first composite layer is equal to the refractive index of the first refractive index layer of the second composite layer, and the refractive index of the second refractive index layer of the first composite layer is greater than the refractive index of the second refractive index layer of the second composite layer;
wherein the refractive index of the second refractive index layer of the first composite layer is equal to the refractive index of the first refractive index layer of the third composite layer; and
wherein the refractive index of the second refractive index layer of the second composite layer is equal to the refractive index of the second refractive index layer of the third composite layer.

12. A method for manufacturing a composite film module, comprising:
providing a substrate; and
forming, by thin-film deposition or spraying, at least two composite layers on a side of the substrate to cover the substrate,
wherein the composite film module comprises the at least two composite layers, each of the at least two composite layers comprises a first refractive index layer and a second refractive index layer that are stacked, and the first refractive index layer has a refractive index greater than a refractive index of the second refractive index layer;
wherein one of the first refractive index layers of the at least two composite layers is disposed between every two adjacent second refractive index layers of the second refractive index layers of the at least two composite layers, and one of the second refractive index layers is disposed between every two adjacent first refractive index layers of the first refractive index layers;
wherein along a thickness direction of the composite film module a first composite layer and a second composite layer of the at least two composite layers are adjacent to each other;
wherein the refractive index of the first refractive index layer of the first composite layer is equal to the refractive index of the first refractive index layer of the second composite layer, and the refractive index of the second refractive index layer of the first composite layer is greater than the refractive index of the second refractive index layer of the second composite layer; and
wherein the second refractive index layer of the first composite layer and the second refractive index layer of the second composite layer are each made of silicon oxynitride, and a nitrogen content in the second refractive index layer of the first composite layer is greater than a nitrogen content in the second refractive index layer of the second composite layer.

13. A display device, comprising:
a display panel; and
a composite film module disposed at a light-exiting side of the display panel,
wherein the composite film module comprises at least two composite layers, wherein each of the at least two composite layers comprises a first refractive index layer and a second refractive index layer that are stacked, and the first refractive index layer has a refractive index greater than a refractive index of the second refractive index layer;
wherein one of the first refractive index layers of the at least two composite layers is disposed between every two adjacent second refractive index layers of the second refractive index layers of the at least two composite layers, and one of the second refractive index layers is disposed between every two adjacent first refractive index layers of the first refractive index layers;
wherein along a thickness direction of the composite film module, a first composite layer and a second composite layer of the at least two composite layers are adjacent to each other;
wherein the refractive index of the first refractive index layer of the first composite layer is equal to the refractive index of the first refractive index layer of the second composite layer, and the refractive index of the second refractive index layer of the first composite layer is greater than the refractive index of the second refractive index layer of the second composite layer;
wherein the second refractive index layer of the first composite layer and the second refractive index layer of the second composite layer are each made of silicon oxynitride, and a nitrogen content in the second refractive index layer of the first composite layer is greater than a nitrogen content in the second refractive index layer of the second composite layer; and
wherein the refractive index of the first refractive index layer of the composite film module is greater than or equal to the refractive index of each of other first refractive index layers of the first refractive index layers of the composite film module.

14. The display device according to claim 13, further comprising:
an antifouling layer disposed at a side of the composite film module facing away from the display panel,
wherein the antifouling layer has a refractive index smaller than the refractive index of the second refractive index layer of the composite film module closest to the antifouling layer.

15. The display device according to claim 13, further comprising:
a cover disposed between the composite film module and the display panel.

16. The display device according to claim 15, wherein the cover comprises a glass and a flexible base that are stacked, wherein the flexible base is disposed between the glass and the composite film module.

* * * * *